United States Patent
Vdovychenko et al.

(10) Patent No.: US 12,499,635 B2
(45) Date of Patent: Dec. 16, 2025

(54) ELECTRONIC DEVICE AND METHOD FOR PROVIDING AUGMENTED REALITY ENVIRONMENT INCLUDING ADAPTIVE MULTI-CAMERA

(71) Applicant: Samsung Electronics Co., Ltd., Suwon-si (KR)

(72) Inventors: Iegor Vdovychenko, Kyiv (UA); Oleksandr Sapozhnik, Kyiv (UA); Vladyslav Dykyi, Kyiv (UA); Volodymyr Savin, Kyiv (UA); Alona Vitiuk, Kyiv (UA); Andrii Tuzhykov, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 18/469,996

(22) Filed: Sep. 19, 2023

(65) Prior Publication Data

US 2024/0104867 A1    Mar. 28, 2024

(30) Foreign Application Priority Data

Sep. 23, 2022    (KR) ........................ 10-2022-0120908

(51) Int. Cl.
    *G06T 19/00*      (2011.01)
    *H04N 23/61*      (2023.01)
    *H04N 23/69*      (2023.01)
    *H04N 23/695*      (2023.01)

(52) U.S. Cl.
    CPC ........... *G06T 19/006* (2013.01); *H04N 23/61* (2023.01); *H04N 23/69* (2023.01); *H04N 23/695* (2023.01)

(58) Field of Classification Search
    CPC ........ G06F 3/012; G06F 3/013; G06T 19/006
    See application file for complete search history.

(56) References Cited

U.S. PATENT DOCUMENTS

| | | |
|---|---|---|
| 7,961,234 B2 | 6/2011 | Viinikanoja et al. |
| 7,990,422 B2 | 8/2011 | Ahiska et al. |
| 9,720,238 B2 | 8/2017 | Munger et al. |
| 10,073,462 B2 | 9/2018 | Debreczeni |
| 10,257,433 B2 | 4/2019 | Kromaki |
| 10,621,767 B2 | 4/2020 | Forutanpour et al. |
| 11,079,606 B2 | 8/2021 | Juhola et al. |
| 2009/0122164 A1 | 5/2009 | Maki et al. |
| 2016/0217623 A1* | 7/2016 | Singh ................... G09G 5/00 |

(Continued)

FOREIGN PATENT DOCUMENTS

| | | |
|---|---|---|
| EP | 3 215 885 A1 | 9/2017 |
| JP | 08088815 A2 | 4/1996 |
| WO | 2016/073734 A1 | 5/2016 |

*Primary Examiner* — Charles Tseng
(74) *Attorney, Agent, or Firm* — Jefferson IP Law, LLP

(57) ABSTRACT

An electronic device and method are provided. The electronic device includes receiving a plurality of operation contexts for the wearable electronic device to perform an operation according to an operation context, designating a priority between the plurality of operation contexts, calculating a parameter related to a movement of a plurality of cameras to perform an operation context having a top priority, and changing a combined field-of-view (FoV) and overlapping area formed by the plurality of cameras based on the movement of the plurality of cameras, wherein the plurality of cameras are configured to moved, independently.

19 Claims, 16 Drawing Sheets

(56) References Cited

U.S. PATENT DOCUMENTS

| | | | |
|---|---|---|---|
| 2016/0239080 A1* | 8/2016 | Marcolina | G06F 3/017 |
| 2019/0098287 A1 | 3/2019 | Cabral et al. | |
| 2020/0241634 A1* | 7/2020 | Iyer | H04N 19/17 |
| 2021/0303067 A1 | 9/2021 | Young et al. | |
| 2022/0044356 A1 | 2/2022 | Zhong et al. | |

* cited by examiner

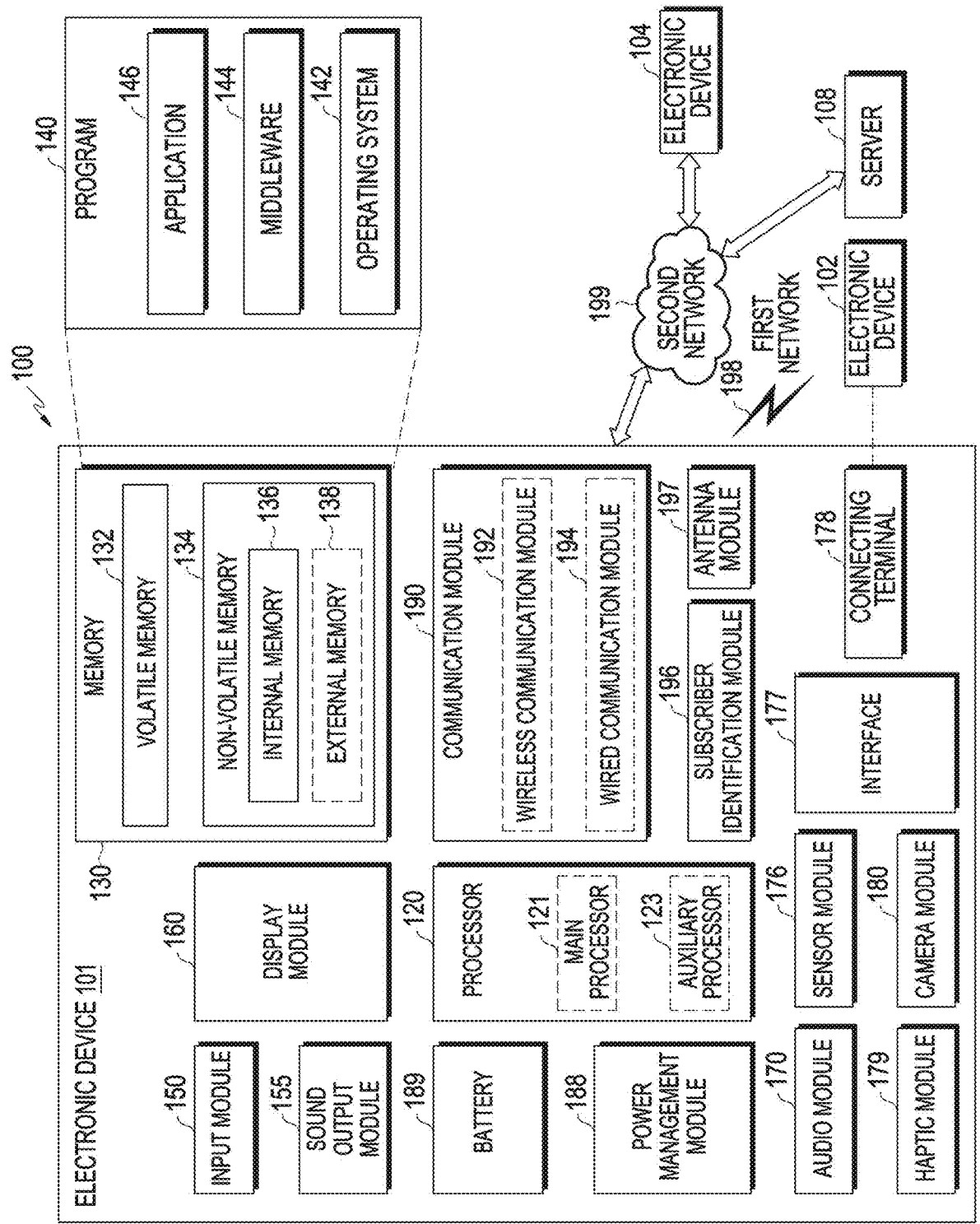

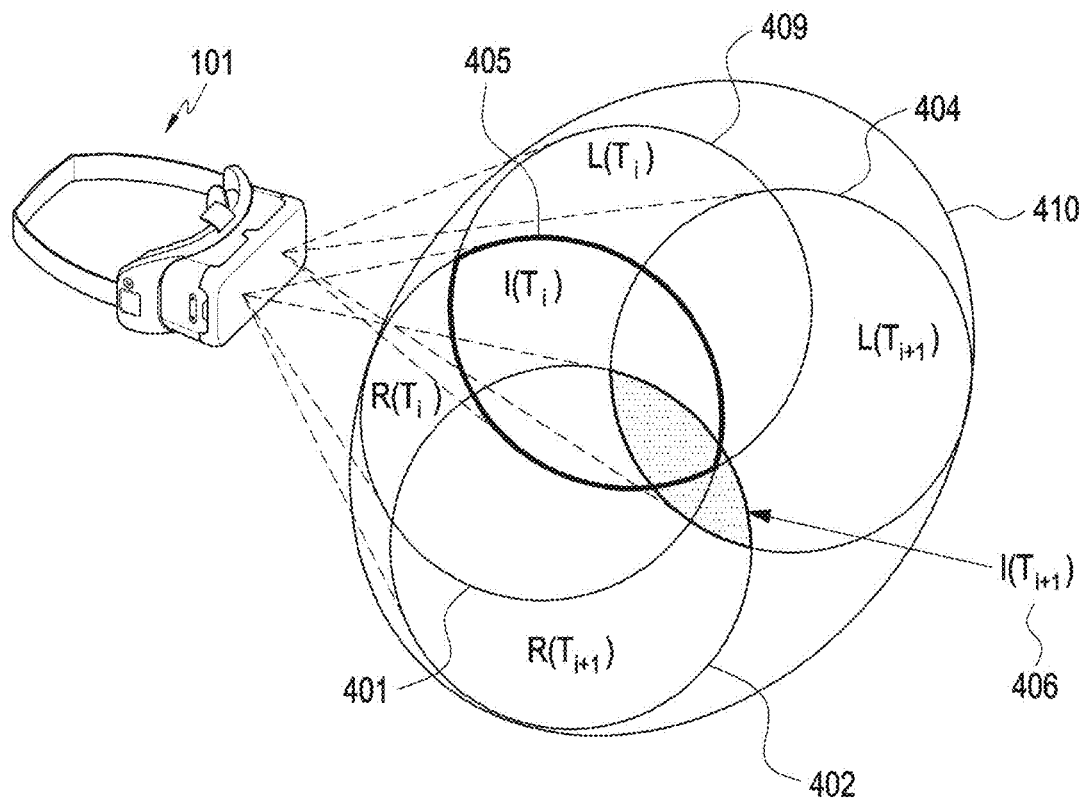
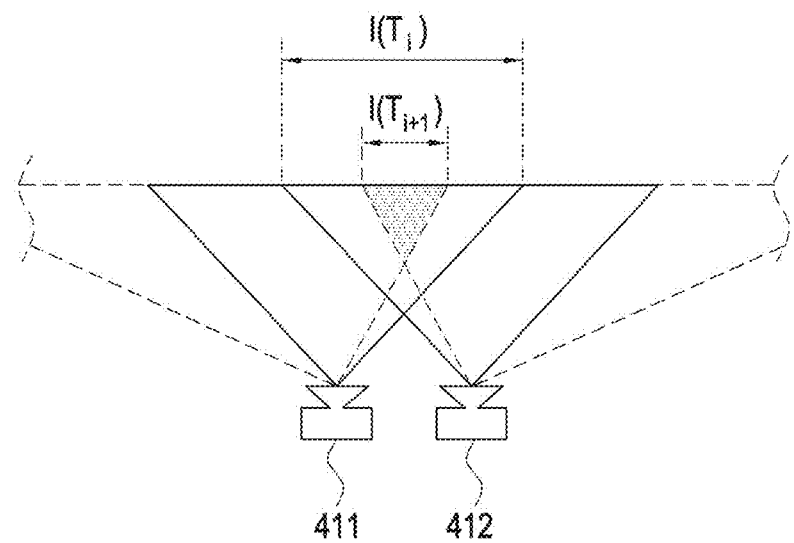
FIG. 4

ELECTRONIC DEVICE AND METHOD FOR PROVIDING AUGMENTED REALITY ENVIRONMENT INCLUDING ADAPTIVE MULTI-CAMERA

CROSS-REFERENCE TO RELATED APPLICATION(S)

This application is based on and claims priority under 35 U.S.C. § 119(a) of a Korean patent application number 10-2022-0120908, filed on Sep. 23, 2022, in the Korean Intellectual Property Office, the disclosure of which is incorporated by reference herein in its entirety.

BACKGROUND

1. Field

The disclosure relates to an electronic device providing an augmented reality or virtual environment including adaptive multiple cameras.

2. Description of Related Art

The emergence of neural processing units (NPUs) and artificial intelligence (AI) technologies in recent years has given a major boost to the augmented reality (AR) industry, and the market for AR and virtual reality (VR) is growing rapidly. In the AR industry, major players are focusing on basic software (SW) and AR app development, and are expanding into various fields such as mobile AR, shopping AR, navigation AR, and enterprise AR. The AR market was a $26.75 billion market in 2021, and is expected to reach $340 billion by 2028. To support this tremendously growing AR market, electronic devices may provide virtual reality, which allows users to have life-like experiences in a computer-generated virtual world. Electronic devices may also provide augmented reality, which adds virtual information (or objects) to the real world, and mixed reality (MR), which is a combination of virtual and augmented reality. The electronic device may include a head up display (HUD) for providing virtual reality and augmented reality.

To implement augmented reality, an electronic device may include a plurality of cameras (or lenses). For example, a plurality of cameras may be required to capture the respective images of the user's eyes to track eye movements. Depending on a field of view (FOV) of the plurality of cameras and a region of interest (ROI) that the cameras are scanning within the FOV, the electronic device may identify various data and information. Electronic devices that provide augmented reality may be equipped with multiple cameras (two or more) to provide a better experience for a user. Some AR/VR head mounted device (HMD) models on the market pack four or six cameras. Multiple cameras in an electronic device providing augmented reality may generally be mounted in a fixed state as there is no variation in internal or external parameters. The position and orientation of the multiple cameras in the electronic device providing augmented reality are factors that are unlikely to yield the maximum theoretical performance from the perspective of a computer vision solution. In order to maximize the performance (quality, inference time, etc.) of a computer vision (CV) solution, it is necessary to control and vary the internal and external parameters taking into account the requirements.

For electronic devices providing augmented reality, a limited FOV may limit the user experience. In hands tracking, 6-degree-of-freedom (6DoF) positioning, simultaneous localization and mapping (SLAM), and three dimensional (3D) spatial modeling operations performed by electronic devices providing augmented reality, one way to effectively extend the FoV is to add more cameras. However, adding more cameras increases power consumption, which reduces the device's uptime. The complexity of the algorithm increases. There may be issues with placement space or weight.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wearable electronic device including a transceiver, a plurality of cameras, and at least one processor, wherein the at least one processor is configured to receive, through the transceiver, a plurality of operation contexts for the wearable electronic device to perform an operation according to an operation context, designate a priority between the plurality of operation contexts, control a parameter related to a movement of the plurality of cameras to perform an operation context having a top priority, and change a combined field-of-view (FoV) and overlapping area formed by the plurality of cameras based on the movement of the plurality of cameras, and wherein the plurality of cameras are configured to move, independently.

Additional aspects will be set forth in part in the description which follows and, in part, will be apparent from the description, or may be learned by practice of the presented embodiments.

In accordance with an aspect of the disclosure, a method by a wearable electronic device is provided. The method includes receiving a plurality of operation contexts for the wearable electronic device to perform an operation according to an operation context, designating a priority between the plurality of operation contexts, calculating a parameter related to a movement of a plurality of cameras to perform an operation context having a top priority, and changing a combined field-of-view (FoV) and overlapping area formed by the plurality of cameras depending on a situation as the plurality of cameras move, wherein each of the plurality of cameras moves.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a view illustrating an electronic device in a network environment according to an embodiment of the disclosure;

FIG. 4 illustrates an FoV by an adaptive multi-camera system according to an embodiment of the disclosure;

Throughout the drawings, it should be noted that like reference numbers are used to depict the same or similar elements, features, and structures.

DETAILED DESCRIPTION

Figure 2A:
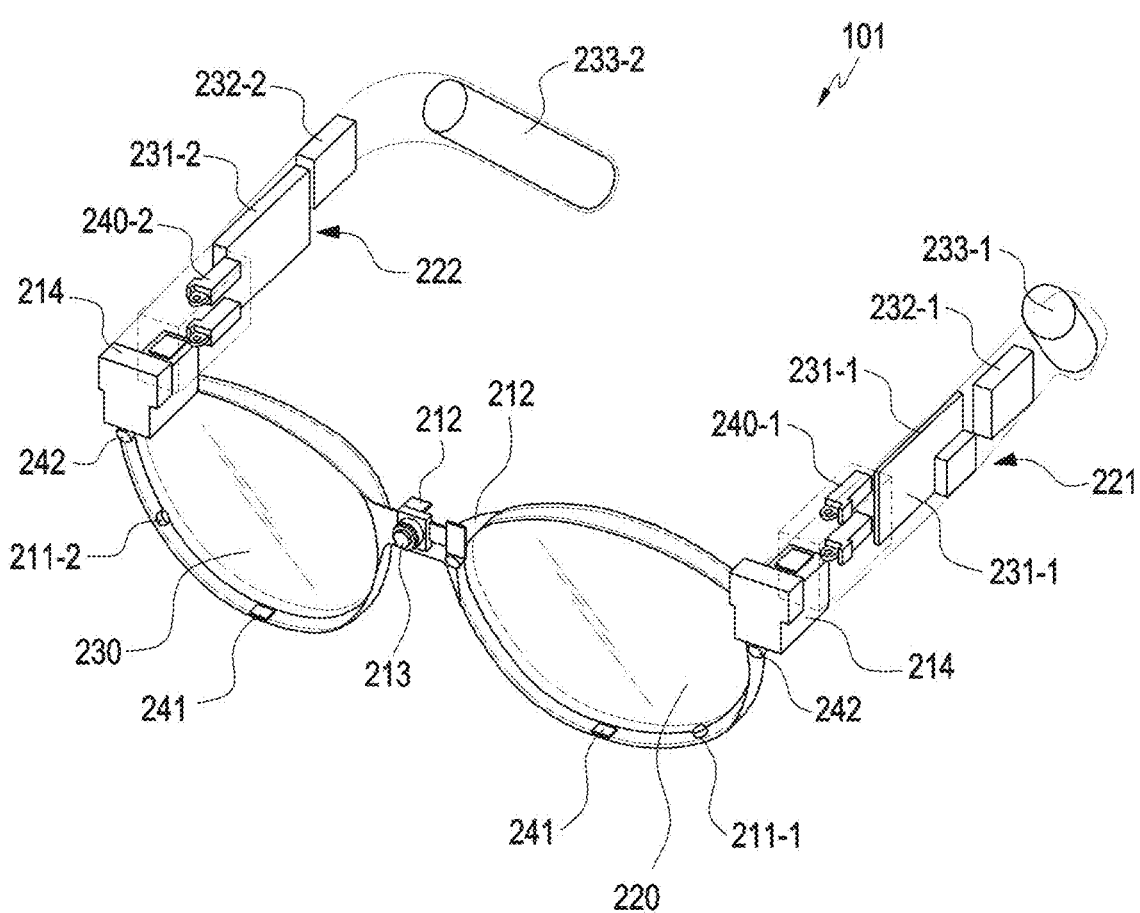
FIG. 2A is a view illustrating an electronic device including a plurality of cameras according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal. According to yet another embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. In another embodiment, some (e.g., the sensor module 176, the camera module 180, or the antenna module 197) of the components may be integrated into a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. In an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (i.e., internal memory 136 or external memory 138). According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to another embodiment, the display 160 may include a touch sensor configured to detect a touch, or a pressure sensor configured to measure the intensity of a force generated by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, an audio connector (e.g., a headphone connector), and the like.

The haptic module 179 may convert an electrical signal into a mechanical stimulus (e.g., a vibration or motion) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. In an embodiment, the camera module 180 may include one or more lenses, image sensors, image signal processors, or flashes.

The power management module 188 may be configured to manage power supplied to the electronic device 101. According to another embodiment, the power management module 188 may be implemented as at least part of, for example, a power management integrated circuit (PMIC).

The battery 189 may supply power to at least one component of the electronic device 101. In another embodiment, the battery 189 may include, for example, a primary cell which is not rechargeable, a secondary cell which is rechargeable, or a fuel cell.

The communication module 190 may be configured to support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may, for example, include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth-generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. In another embodiment, the wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. In another embodiment, the wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to one embodiment, the antenna module 197 may include one antenna including a radiator formed of a conductive body or conductive pattern formed on a substrate (e.g., a printed circuit board (PCB)). According to another embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to some embodiments, the antenna module 197 may form a mmWave antenna module. In an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. The external electronic devices 102 or 104 each may be a device of the same or a different type from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. In another embodiment, the electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to still another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, and the like. In an embodiment of the disclosure, the electronic devices are not limited to those described above.

FIG. 2A is a view illustrating a configuration of an electronic device (e.g., the electronic device 101 of FIG. 1) including a plurality of cameras according to an embodiment of the disclosure.

Figure 2B:
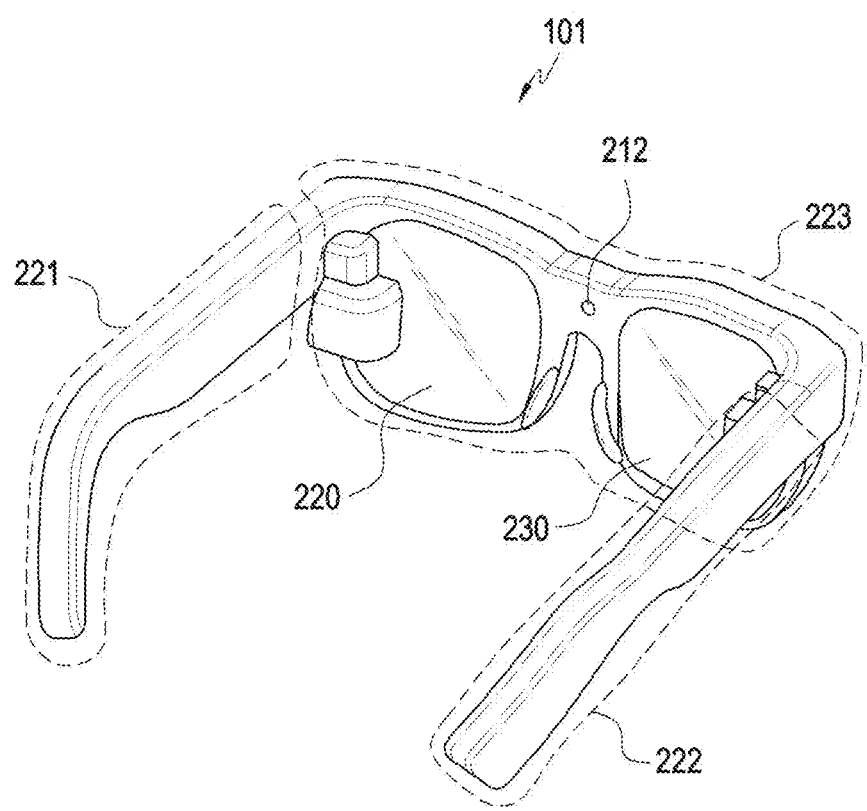
FIG. 2B is a rear perspective view illustrating an electronic device according to an embodiment of the disclosure.

FIG. 2B is a rear perspective view illustrating an electronic device, in which an internal configuration may be the same as that shown in FIG. 2A according to an embodiment of the disclosure.

In some embodiments, an electronic device 101 may be worn on the user's head to provide the user with an image related to the AR service. According to an embodiment, the electronic device 101 may provide an augmented reality service that outputs at least one virtual object to overlap an area determined as a field of view (FoV) of the user. In an example, the area determined as the field of view of the user may be an area determined to be recognizable by the user wearing the electronic device 101 through the electronic device 101, and may be an area including all or at least a portion of the display module (e.g., the display module 160 of FIG. 1) of the electronic device 101. According to another embodiment, the electronic device 101 may include a plurality of glasses (e.g., a first glass 220 and/or a second glass 230) respectively corresponding to both eyes (e.g., the left eye and/or the right eye) of the user. The plurality of glasses may include at least a portion of a display module (e.g., the first display module 351 and/or the second display module 353 of FIG. 3). In another example, the first glass 220 corresponding to the left eye of the user may include the first display module 351, and the second glass 230 corresponding to the right eye of the user may include the second display module 353. For example, the electronic device 101 may be configured as glasses, goggles, a helmet, or a hat, but is not limited thereto.

Referring to FIG. 2A, an electronic device 101 according to an embodiment may include a display module 214 (e.g., a display module 160 of FIG. 1), a camera module (e.g., a camera module 180 of FIG. 1), an audio module (e.g., an audio module 170 of FIG. 1), a first support 221, and/or a second support 222. According to an embodiment, the display module 160 may include a first display (e.g., a first glass 220) (e.g., a first display module 351 of FIG. 3) and/or a second display (e.g., a second glass 230) (e.g., a second display module 353 of FIG. 3). According to one embodiment, the at least one camera may include a front camera 213 for capturing an image corresponding to the user's field of view and/or measuring the distance to the object, an eye tracking camera 212 for identifying the direction of the user's gaze, and/or the recognition cameras (gesture cameras) 211-1 and 211-2 for recognizing a predetermined space. For example, the front camera 213 may photograph the front, i.e., in the front direction of the electronic device 101, and the eye tracking camera 212 may photograph the rear, i.e., in the direction opposite to the photographing direction of the front camera 213. For example, the eye tracking camera 212 may at least partially photograph both eyes of the user including the left eye and the right eye of the user wearing the electronic device 101, which are positioned behind the electronic device 101. According to another embodiment, the first support 221 and/or the second support 222 may include printed circuit boards (PCBs) 231-1 and 231-2, speakers 232-1 and 232-2, and/or batteries 233-1 and 233-2.

In an embodiment, the display module 160 (e.g., the display module 214 of FIG. 2A) may be disposed in a frame (e.g., the frame 223 of FIG. 2B) of the electronic device 101, and may include a condensing lens (not illustrated) and/or a transparent waveguide (not illustrated) on the glass (e.g., the first glass 220 and the second glass 230). For example, the transparent waveguide may be at least partially positioned on a portion of the glass. In another embodiment, the light emitted from the display module 160 may be incident on one end of the glass through the first glass 220 and the second glass 230, and the incident light may be transferred to the user through the waveguide formed in the glass. The waveguide may be formed of glass, plastic, or polymer, and may include a nanopattern formed on one inner or outer surface, e.g., a grating structure having a polygonal or curved shape. In yet another embodiment, the incident light may be propagated or reflected inside the waveguide by the nanopattern and provided to the user. In still another embodiment, the waveguide may include at least one of at least one diffractive element (e.g., a diffractive optical element (DOE) or a holographic optical element (HOE)) or a reflective element (e.g., a reflective mirror). The waveguide may lead the display light emitted from the light source unit to the user's eyes using at least one diffractive element or reflective element.

Referring to FIG. 2A, the first support 221 and/or the second support 222 may include printed circuit boards 231-1 and 231-2 for transmitting an electrical signal to each component of the electronic device 101, speakers 232-1 and 232-2 for outputting an audio signal, batteries 233-1 and 233-2, and/or hinge portions 240-1 and 240-2 for at least partially coupling to the frame 223 of the electronic device 101. According to one embodiment, the speakers 232-1 and 232-2 may include a first speaker 232-1 for transferring an audio signal to the left ear of the user and a second speaker 232-2 for transferring an audio signal to the right ear of the user. The speakers 232-1 and 232-2 may be included in the audio module 170 of FIG. 1. According to another embodiment, the electronic device 101 may include a plurality of batteries 233-1 and 233-2, and may supply power to the printed circuit boards 231-1 and 231-2 through a power management module (e.g., the power management module 188 of FIG. 1).

Referring to FIG. 2A, the electronic device 101 may include a microphone 241 for receiving the user's voice and/or ambient sound. In an example, the microphone 241 may be included in the audio module 170 of FIG. 1. The electronic device 101 may include at least one light emitting device (illumination LED) 242 for increasing the accuracy of at least one camera (e.g., the front camera 213, the eye tracking camera 212, and/or the recognition cameras 211-1 and 211-2). In another example, the light emitting device 242 may be used as an auxiliary means for increasing accuracy when photographing the pupil of the user with the eye tracking camera 212, and the light emitting device 242 may use an infrared light emitting diode (IR LED) having an infrared wavelength rather than a visible light wavelength. As yet another example, the light emitting device 242 may be used as an auxiliary means when it is not easy to detect the subject to be photographed due to a dark environment or mixed and/or reflected light of various light sources when photographing the user's gesture with the recognition cameras 211-1 and 211-2.

Referring to FIGS. 2A and 2B, the electronic device 101 according to an embodiment may include a frame 223 and a support (e.g., the first support 221 and/or the second support 222), and the frame 223 and the supports 221 and 222 may be operatively connected. In an example, the frame 223 and the supports 221 and 222 may be operatively connected to each other through the hinge portions 240-1 and 240-2. The frame 223 may be at least partially mounted on the user's nose and may include a display module 160 and a camera module (e.g., the camera module 180 of FIG. 1). The supports 221 and 222 may include a supporting member mounted on the user's ear, and may include a first support 221 mounted on the left ear and/or a second support 222 mounted on the right ear. The first support 221 or the second support 222 may at least partially include printed circuit boards 231-1 and 231-2, speakers 232-1 and 232-2, and/or batteries 233-1 and 233-2 (e.g., the battery 189 of FIG. 1, the first battery 333 and/or the second battery 343 of FIG. 3). The battery may be electrically connected to a power management module (e.g., the power management module 188 of FIG. 1).

According to one embodiment, the display module 160 may include a first glass 220 and/or a second glass 230, and may provide visual information to the user through the first glass 220 and the second glass 230. The electronic device 101 may include the first glass 220 corresponding to the left eye and/or the second glass 230 corresponding to the right eye. According to another embodiment, the display module 160 may include a display panel and/or a lens (e.g., glass). For example, the display panel may include a transparent material such as glass or plastic.

According to yet another embodiment, the display module 160 may include a transparent element, and the user may recognize an actual space on the rear surface of the display module 160 through the display module 160. The display module 160 may display a virtual object in at least a partial area of the transparent element such that the virtual object is shown to be added to at least a portion of the actual space to the user. According to other embodiments, the display module 160 may output and display an augmented reality (AR) image including the virtual object. The first glass 220 and/or the second glass 230 included in the display module 160 may include a plurality of display panels respectively corresponding to both eyes (e.g., the left eye and/or the right eye) of the user.

The electronic device 101 may include a virtual reality (VR) device (e.g., a virtual reality device). When the electronic device 101 is a VR device, the first glass 220 may be the first display module 351, and the second glass 230 may be the second display module 353.

In an embodiment, the virtual object output through the display module 160 may include information related to an application program executed on the electronic device 101 and/or information related to an external object positioned in the actual space corresponding to the area determined as the user's field of view. For example, the electronic device 101 may identify an external object included in at least a portion of the image information related to the actual space obtained through the camera (e.g., the front camera 213) of the electronic device 101 corresponding to the area determined as the user's field of view. The electronic device 101 may output (or display) the virtual object related to the external object identified in at least a portion through the area determined as the user's field of view in the display area of the electronic device 101. The external object may include an object present in the actual space. In another embodiment, the display area in which the electronic device 101 displays the virtual object may include a portion (e.g., at least a portion of the display panel) of the display module (e.g., the first display module 351 or the second display module 353). According to still another embodiment, the display area may be an area corresponding to at least a portion of the first glass 220 and/or the second glass 230.

The electronic device 101 may include a front camera 213 (e.g., a red, green, and blue (RGB) camera) for capturing an image corresponding to the user's field of view and/or measuring a distance to an object, an eye tracking camera 212 for identifying the direction of the user's gaze, and/or recognition cameras 211-1 and 211-2 (e.g., gesture cameras) for recognizing a predetermined space. According to one embodiment, the electronic device 101 may measure the distance to the object positioned in the front direction of the electronic device 101 using the front camera 213. According to another embodiment, in the electronic device 101, a plurality of eye tracking cameras 212 may be disposed to correspond to both eyes of the user. For example, the eye tracking camera 212 may photograph a direction opposite to the photographing direction of the front camera 213. The eye tracking camera 212 may detect a gaze direction (e.g., pupil movement) of the user. In another example, the eye tracking camera 212 may photograph both the left eye and right eye of the user to track the gaze direction of each of both eyes. According to still another embodiment, the electronic device 101 may detect a user gesture within a predetermined distance (e.g., a predetermined space) using the recognition cameras 211-1 and 211-2. For example, a plurality of recognition cameras 211-1 and 211-2 may be configured, and may be disposed on two opposite side surfaces of the electronic device 101. The electronic device 101 may detect an eye corresponding to the dominant eye and/or the non-dominant eye of the left eye and/or the right eye using at least one camera. For example, the electronic device 101 may detect the eye corresponding to the dominant eye and/or the non-dominant eye, based on the user's gaze direction with respect to the external object and/or the virtual object.

According to an embodiment, the front camera 213 may include a high-resolution camera such as a high resolution (HR) camera and/or a photo video (PV) camera. According to another embodiment, the eye tracking camera 212 may detect the user's pupil to track the gaze direction, and may be utilized such that the center of the virtual image moves corresponding to the gaze direction. The recognition cameras 211-1 and 211-2 may be used for detecting the user's hand (gesture) and/or space recognition, and may include a global shutter (GS) camera. For example, the recognition cameras 211-1 and 211-2 may include a GS camera with low screen drag to detect and track fast hand movements and/or fine movements such as of fingers.

The electronic device 101 may display the virtual object related to an augmented reality service together, based on image information related to the actual space obtained through the camera (e.g., the camera module 180 of FIG. 1) of the electronic device 101. According to another embodiment, the electronic device 101 may display the virtual object based on the display module (e.g., the first display module 351 corresponding to the left eye and/or the second display module 353 corresponding to the right eye) disposed to correspond to both eyes of the user. According to yet another embodiment, the electronic device 101 may display the virtual object based on preset configuration information (e.g., resolution, frame rate, brightness, and/or display area).

In an embodiment, the electronic device 101 may operate the first display panel included in the first glass 220 and the second display panel included in the second glass 230 as independent components. For example, the electronic device 101 may determine the display performance of the first display panel based on first configuration information and may determine the display performance of the second display panel based on second configuration information.

The number and positions of at least one camera (e.g., a front camera 213, an eye tracking camera 212, and/or recognition cameras 211-1 and 211-2) included in the electronic device 101 illustrated in FIGS. 2A and 2B may not be limited. In an example, the number and positions of at least one camera (e.g., the front camera 213, the eye tracking camera 212, and/or the recognition cameras 211-1 and 211-2) may vary based on the form (e.g., shape or size) of the electronic device 101. According to various embodiments, there is only one eye tracking camera 212, which may simultaneously or separately photograph both eyes.

Figure 3:
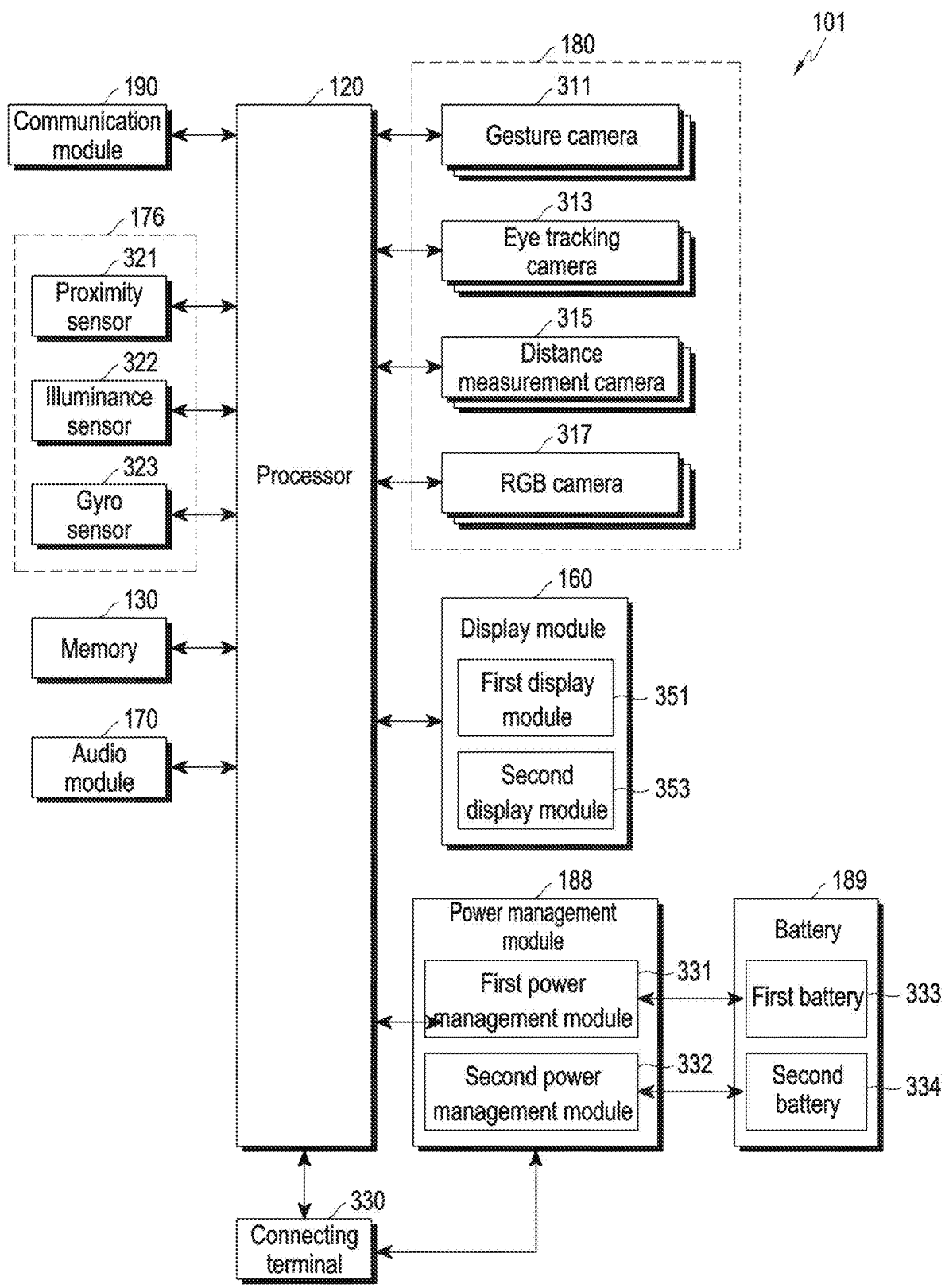
FIG. 3 is a block diagram illustrating an electronic device for tracking a user's gaze and providing an augmented reality (AR) environment according to an embodiment of the disclosure.

FIG. 3 is a block diagram illustrating an electronic device 101 (e.g., the electronic device 101 of FIG. 1) for tracking a user's gaze and providing an augmented reality (AR) environment according to an embodiment of the disclosure.

Referring to FIG. 3, an electronic device 101 may include a processor 120 (e.g., a processor 120 of FIG. 1), a memory 130 (e.g., a memory 130 of FIG. 1), a display module 160 (e.g., a display module 160 of FIG. 1), an audio module 170 (e.g., an audio module 170 of FIG. 1), a sensor module 176 (e.g., a sensor module 176 of FIG. 1), a camera module 180 (e.g., a camera module 180 of FIG. 1), a power management module 188 (e.g., a power management module 188 of FIG. 1), a battery 189 (e.g., a battery 189 of FIG. 1), and/or a communication module (e.g., a communication module 190 of FIG. 1). According to an embodiment, the electronic device 101 may be connected to an external electronic device (e.g., the electronic device 102 of FIG. 1) through a connecting terminal 330 (e.g., USB TYPE-C) (e.g., the connecting terminal 178 of FIG. 1). For example, the power management module 188 of the electronic device 101 may receive power from an external electronic device through the connecting terminal 330 to charge the battery 189. For another example, the processor 120 of the electronic device 101 may perform power line communication with the external electronic device through the connecting terminal 330. According to an embodiment, the electronic device 101 may include a frame (e.g., the frame 223 of FIG. 2B) and a support (e.g., the first support 221 and/or the second support 222 of FIG. 2B). According to an embodiment, the components of the electronic device 101 may be disposed in the frame 223 or the supports 221 and 222.

The processor 120 may execute a program (e.g., the program 140 of FIG. 1) stored in the memory 130 to control at least one other component (e.g., a hardware or software component) and may perform various data processing or operations. According to another embodiment, the processor 120 may provide an augmented reality service to the user. The processor 120 may output, through the display module 160, at least one virtual object such that at least one virtual object is added to the actual space corresponding to the field of view of the user wearing the electronic device 101.

The display module 160 of the electronic device 101 may include at least one glass (e.g., a first glass (e.g., the first glass 220 of FIG. 2A)) and/or a second glass (e.g., the second glass 230 of FIG. 2A). According to another embodiment, the first glass 220 may include at least a portion of the first display module 351, and the second glass 230 may include at least a portion of the second display module 353. For example, each of the first display module 351 and/or the second display module 353 may include a display panel. The display panel may be configured as a transparent element so that the user may recognize the actual space through the display module 160. The display module 160 may display at least one virtual object on at least a portion of the display panel such that the virtual object added to the actual space is shown to the user wearing the electronic device 101. For example, the user's field of view may include an angle and/or a range where the user may recognize an object. According to yet another embodiment, the display module 160 may include a first display module 351 corresponding to the user's left eye and/or a second display module 353 corresponding to the user's right eye. According to an embodiment, the processor 120 may load configuration information (e.g., resolution, frame rate, size of a display area, and/or sharpness) related to the performance of the display module 160 from the memory 130 and may adjust the performance of the display module 160 based on the configuration information. According to still another embodiment, configuration information may be individually determined for each display panel included in the display module 160. For example, the first display panel corresponding to the left eye may be configured based on the first configuration information, and the second display panel corresponding to the right eye may be configured based on the second configuration information. According to another embodiment, at least a portion of the configuration information may be configured to differ for one display panel included in the display module 160. In another example, the electronic device 101 may configure at least one of the resolution, the frame rate, and/or sharpness of the display module 160 to differ. According to an embodiment, the electronic device 101 may reduce power consumption by at least partially changing the configuration of the display module 160.

The audio module 170 may convert a sound into an electrical signal or convert an electrical signal into a sound, under control of the processor 120. For example, the audio module 170 may include the speakers 232-1 and 232-2 of FIG. 2A and/or the microphone 241 of FIG. 2A.

The sensor module 176 of the electronic device 101 may include a proximity sensor 321, an illuminance sensor 322, and/or a gyro sensor 323. According to an embodiment, the proximity sensor 321 may detect an object adjacent to the electronic device 101. The illuminance sensor 322 may measure the brightness level around the electronic device 101. In an embodiment, the processor 120 may identify the degree of brightness around the electronic device 101 using the illuminance sensor 322 and may change the brightness-related configuration information about the display module 160 based on the degree of brightness. For example, if the ambient brightness is brighter than a predetermined brightness, the processor 120 may set the degree of brightness of the display module 160 to be higher so that the visibility of the user increases. In another embodiment, the gyro sensor 323 may detect the posture and/or position of the electronic device 101. For example, the gyro sensor 323 may detect whether the electronic device 101 is properly worn on the user's head. For another example, the gyro sensor 323 may detect a movement of the electronic device 101 or the user wearing the electronic device 101.

The electronic device 101 may perform wireless communication with another electronic device (e.g., the electronic devices 102 and 104 of FIG. 1) through the communication module 190 (e.g., a wireless communication circuit). For example, the electronic device 101 may perform wireless communication with a portable electronic device (e.g., a smartphone) and may exchange instructions and/or data with each other. According to an embodiment, the electronic device 101 may be at least partially controlled by another external electronic device (e.g., a portable electronic device). In an example, the electronic device 101 may perform at least one function under the control of another external electronic device.

According to some embodiments, the electronic device 101 may change at least part of the configuration of the display panel under the control of another electronic device (e.g., the electronic device 102 or 104 of FIG. 1) connected wirelessly and/or wiredly. The electronic device 101 may transmit, to another electronic device, dominant eye/non-dominant eye-related information (e.g., distance information from an object positioned in the actual space, gaze tracking information about the user, or gesture information about the user) obtained through a camera (e.g., the camera module 180 of FIG. 1) of the electronic device 101. Another electronic device may, for example, transmit configuration information about the display panel included in the glass (e.g., the first glass 220 and/or the second glass 230) corresponding to the detected dominant eye or non-dominant eye to the electronic device 101, based on the dominant eye/non-dominant eye-related information received from the electronic device 101. The electronic device 101 may change at least a part of the configuration of the display panel based on the configuration information about the display panel received from another electronic device. For example, the configuration of the display panel may be changed to decrease the quality of the display panel, and at least part of the configuration may be changed in such an extent that it is not noticed by the user. The electronic device 101 may reduce the resolution of the display panel, may reduce the frame rate, or may adjust the size and/or position of the display area of the display panel.

The camera module 180 of the electronic device 101 may, for example, include a gesture camera 311, an eye tracking camera 313, a depth camera 315, and/or an RGB camera 317. According to an embodiment, the gesture camera 311 may detect a movement of the user. The recognition cameras 211-1 and 211-2 of FIG. 2A may include a gesture camera 311. In an example, at least one gesture camera 311 may be disposed in the electronic device 101 and may detect a hand movement of the user within a predetermined distance. The gesture camera 311 may include a simultaneous localization and mapping camera (SLAM) for recognizing information (e.g., position and/or direction) related to the surrounding space of the electronic device 101. The gesture recognition area of the gesture camera 311 may be set based on the photographable range of the gesture camera 311. According to another embodiment, the eye tracking camera 313 (e.g., the eye tracking camera 212 of FIG. 2A) may track movements of the left eye and the right eye of the user. According to an embodiment of the disclosure, the processor 120 may identify the gaze direction of the left eye and the gaze direction of the right eye using the eye tracking camera 313. For example, the eye tracking camera 313 may photograph both the left eye and right eye of the user to track the gaze direction of each of both eyes. According to still another embodiment of the disclosure, the processor 120 may determine the dominant eye and the non-dominant eye based on the gaze direction of the left eye and the gaze direction of the right eye. According to yet another embodiment, the distance measurement camera 315 may measure the distance to an object positioned in front of the electronic device 101. The front camera 213 of FIG. 2A may include a distance measurement camera 315. The distance measurement camera 315 may include a time of flight (TOF) camera and/or a depth camera. In an embodiment, the distance measurement camera 315 may photograph the front direction of the electronic device 101, and the eye tracking camera 313 may photograph a direction opposite to the photographing direction of the distance measurement camera 315. In another embodiment, the electronic device 101 may measure the distance to the object using the distance measurement camera 315, and may change the configuration of the display panel when the distance is greater than or equal to a threshold. For example, when the distance to the object is less than or equal to the threshold, the electronic device 101 may maintain the display performance of the display panel. In yet another embodiment, the electronic device 101 may recognize, with the eye tracking camera 313, one of objects positioned in the user's gaze direction (e.g., FOV), may calculate the depth of the distance to the corresponding object through the depth camera, or may measure the distance to the corresponding object through the TOF camera. In still another embodiment, the RGB camera 317 may detect color-related information about the object and/or distance information from the object. According to an embodiment, the electronic device 101 may include one type of camera by integrating the distance measurement camera 315 and the RGB camera 317. For example, the front camera 213 of FIG. 2A may include the distance measurement camera 315 and/or the RGB camera 317. Each of the gesture camera 311, the eye tracking camera 313, the distance measurement camera 315, and/or the RGB camera 317 included in the camera module 180 may be included in the electronic device 101, or some of the gesture camera 311, the eye tracking camera 313, the distance measurement camera 315, and/or the RGB camera 317 may be implemented as an integrated camera. For example, the distance measurement camera 315 and the RGB camera 317 may be implemented as one integrated camera.

The power management module 188 may manage power supplied to the electronic device 101. The power management module 188 may, for example, include a plurality of power management modules (e.g., the first power management module 331 and the second power management module 332). At least part of the first power management module 331 or the second power management module 332 may be directly connected to the processor 120 to supply power. At least part of the first power management module 331 or the second power management module 332 may receive power from an external electronic device via the connecting terminal 330 (e.g., TYPE-C), and may charge the battery 189 or supply power to other components of the electronic device 101. According to an embodiment, the electronic device 101 may charge the battery 189 by receiving power from an external electronic device through a wireless charging scheme. The power management module 188 may be electrically connected with components (e.g., the memory 130, the display module 160, the audio module 170, the sensor module 176, the camera module 180, and/or the communication module 190) of the electronic device 101. For example, the power management module 188 may provide power of the battery 189 to components of the electronic device 101 under the control of the processor 120. According to another embodiment, the electronic device 101 may receive power from the first battery 333 through the first power management module 331, and may receive power from the second battery 334 through the second power management module 332. According to yet another embodiment, the processor 120 may manage consumed power by at least partially changing the configuration of the display module 160 based on information obtained using the at least one camera 311, 313, 315, and 317 included in the camera module 180.

According to an embodiment, the battery 189 may be charged by receiving power or discharged by providing power under the control of the power management module 188. According to another embodiment, the battery 189 may include a plurality of batteries (e.g., the first battery 333 and the second battery 343). For example, a plurality of batteries (e.g., the first battery 333 and the second battery 343) may be disposed on the frame 223 and a support (e.g., the first support 221 and/or the second support 222). According to yet another embodiment, the first battery 333 may be disposed on the first support 221, and the second battery 343 may be disposed on the second support 222.

The electronic device 101 may include a first camera (e.g., a distance measurement camera 315 of FIG. 3) photographing the front surface of the electronic device 101, a second camera (e.g., a gaze tracking camera 313 of FIG. 3) photographing a direction opposite to the photographing direction of the first camera to identify gaze directions of the user's left eye and right eye, a first display panel (e.g., a first display module 351 of FIG. 3) corresponding to the left eye, a second display panel (e.g., a second display module 353 of FIG. 3) corresponding to the right eye, a memory 130, and a processor 120 operatively connected to the first camera 315, the second camera 313, the first display panel, the second display panel, and the memory 130. The processor 120 may identify the dominant eye and/or the non-dominant eye of the left eye and the right eye, and may change the configuration of the display panel corresponding to the identified non-dominant eye of the first display panel and the second display panel to be at least partially different from the configuration of the display panel corresponding to the identified dominant eye.

According to one embodiment, the processor 120 may identify gaze directions of the left eye and the right eye using at least one of the first camera 315 and the second camera 313, and may identify the dominant eye and the non-dominant eye of the left eye and the right eye based on the identified gaze directions.

According to another embodiment, the processor 120 may measure the distance to the object using the first camera 315, and when the measured distance exceeds a threshold, the processor 120 may identify the gaze directions of the left eye and the right eye of the user using the second camera 313.

According to still another embodiment, the electronic device 101 may further include an illuminance sensor (e.g., the illuminance sensor 322 of FIG. 3) detecting ambient brightness, and the processor 120 may identify whether a brightness value measured using the illuminance sensor 322 is less than or equal to a threshold, and may adjust the resolution of the display panel corresponding to the non-dominant eye to decrease when the brightness value is less than or equal to the threshold.

According to yet another embodiment, the processor 120 may identify the movement of the object at which the user gazes based on the gaze direction, may identify whether the movement of the object exceeds a preset reference value, and may adjust the frame rate of the display panel corresponding to the non-dominant eye to decrease when the movement exceeds the reference value.

The processor 120 may adjust the resolution to be low based on a preset time interval, and may adjust the frame rate to decrease based on a preset time interval.

In an embodiment, the processor 120 may identify the movements of the left eye and the right eye, may identify whether the movement of the eye exceeds a predetermined reference value, and may adjust the display area of the display panel corresponding to the non-dominant eye to decrease when the movement exceeds the reference value.

In another embodiment, the processor 120 may generate a virtual object at least partially on the first display panel and the second display panel, may identify the gaze direction of the left eye and the gaze direction of the right eye of the user who gazes at the object through the virtual object using the second camera, and may identify the non-dominant eye of the left eye and the right eye based on the identified gaze direction.

In yet another embodiment, the electronic device 101 may further include a third camera (e.g., the gesture camera 311 of FIG. 3) detecting the user's gesture. The processor 120 may detect the position of the hand of the user who has generated an arbitrary circle by using the third camera, may identify the gaze direction of the left eye and the gaze direction of the right eye of the user who gazes at the object through the circle by using the second camera, and may identify the non-dominant eye of the left eye and the right eye based on the identified gaze direction.

In still another embodiment, the processor 120 may identify the left eye corresponding to the non-dominant eye and the right eye corresponding to the dominant eye, may identify whether the dominant eye is changed based on the gaze direction of the left eye and the gaze direction of the right eye, and may at least partially change the configuration of the display panel corresponding to the right eye changed to the non-dominant eye when it is identified that the dominant eye is changed to the left eye.

When it is identified that the dominant eye is changed to the left eye, the processor 120 may restore the display performance of the display panel corresponding to the left eye changed to the dominant eye to the initial configuration.

The processor 120 may measure the distance to the object using the first camera 315, and may at least partially change the configuration of the display panel corresponding to the non-dominant eye when the measured distance exceeds a threshold.

FIG. 4 illustrates an FoV by an adaptive multi-camera system according to an embodiment of the disclosure.

Figure 5:
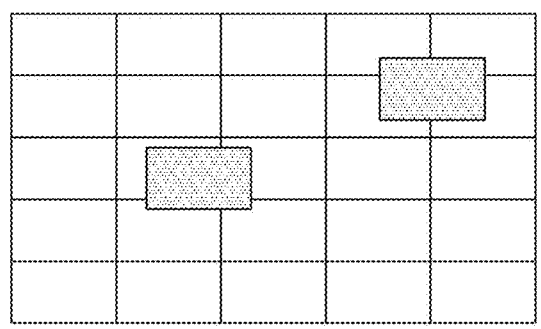
FIG. 5 illustrates FoV and RoI areas formed by a plurality of cameras according to an embodiment of the disclosure.

FIG. 5 illustrates FoV and an RoI areas formed by a plurality of cameras according to an embodiment of the disclosure.

An electronic device 101 according to an embodiment of the disclosure may include one or more cameras. For example, the electronic device 101 may be a wearable device that the user may wear, and may be a glasses-type electronic device in a head mounted device (HMD). In another example, the electronic device 101 may include a camera (e.g., 411 of FIG. 4) positioned at a left portion of the electronic device and a camera (e.g., 412 of FIG. 4) positioned at a right portion of the electronic device when the user wears the electronic device 101.

At least one camera (e.g., 411 and 412 of FIG. 4) included in the electronic device 101 according to an embodiment of the disclosure may be configured to be tilted or moved up, down, left, and right.

Referring to FIG. 4, an area that may be sensed by a camera (e.g., 411 and 412 of FIG. 4) is the field of view (FOV), which may be observed simultaneously by the camera. Referring to FIG. 5, when the electronic device 101 includes a plurality of cameras, an entire FoV (e.g., 501 of FIG. 5) may be formed by combining the respective FoVs of the camera may be formed. The combined FoV 501 may be an area that may be sensed by the electronic device, and the ROI (e.g., 503 of FIG. 5) may be a target area among the FoV areas. In an example, when two or more ROIs are set in the inspection area corresponding to the FoV, for only a portion of the sensor, data may be received and transmitted, and only data of a necessary portion may be retrieved.

The electronic device 101 according to an embodiment of the disclosure may move the camera (e.g., 411 and 412 of FIG. 4) up, down, left, and right. In the comparative example, when the camera is fixed, the FoV area may also be fixed. The camera according to the electronic device of the disclosure may sense as much as L(Ti) (e.g., 409 of FIG. 4) by the left camera and as much as R(Ti) (e.g., 401 of FIG. 4) by the right camera at the time point of Ti, and may further extend the FoV according to the movement of the camera in the FoV area that may be sensed by the left and right cameras (e.g., 411 and 412 of FIG. 4). For example, the camera (e.g., 411 or 412 of FIG. 4) controlled by the processor of the electronic device 102 to perform the programmed operation may secure a overlapping area (e.g., 405 of FIG. 4) where the FOV area sensed by the left camera and the FOV area sensed by the right camera overlap each other at the time point of Ti.

For example, the camera (e.g., 411 or 412 of FIG. 4) controlled by the processor of the electronic device 102 to perform the programmed operation may secure a new FoV area R(Ti+1) (e.g., 402 of FIG. 4) by the right camera and a new FoV area L(Ti+1) (e.g., 404 of FIG. 4) by the left camera at the time point Ti+1 which is a time point after Ti. The electronic device 101 according to an embodiment of the disclosure may be extended to a new FoV area (e.g., 410 of FIG. 4) by a camera (e.g., 411 and 412 of FIG. 4) controlled to move left and right. For example, the camera (e.g., 411 or 412 of FIG. 4) controlled by the processor of the electronic device 102 to perform the programmed operation may secure a overlapping area (e.g., 406 of FIG. 4) where the new FOV area sensed by the left camera and the new FOV area sensed by the right camera overlap each other at the time point Ti+1 which is a time point after Ti.

The electronic device 101 of the disclosure may, for example, guarantee to cover an entire available area required for a vision engine in order to provide a realistic user experience according to movement, rotation, and zoom of a camera or several cameras. In an example, the combined FoV (e.g., 501 of FIG. 5) for the different camera positions may be recognized as one camera together with the ROI (e.g., 503 of FIG. 5) area which is the current ROI. As another example, all vision engines may know the combined FoV and parameters of the current ROIs, and may request the electronic device 101 of the disclosure to search for a specific ROI by requesting movement of the camera from the current position and pixel enlargement. In order to process the requests made by the vision engine, the electronic device 101 of the disclosure may designate priorities of the requests, set a camera position for performing a request having a higher priority, and calculate parameters for setting the camera. For example, the electronic device 101 of the disclosure may transmit the updated information about the image, the calibration matrix, and the current position to the vision engine.

Figure 6:
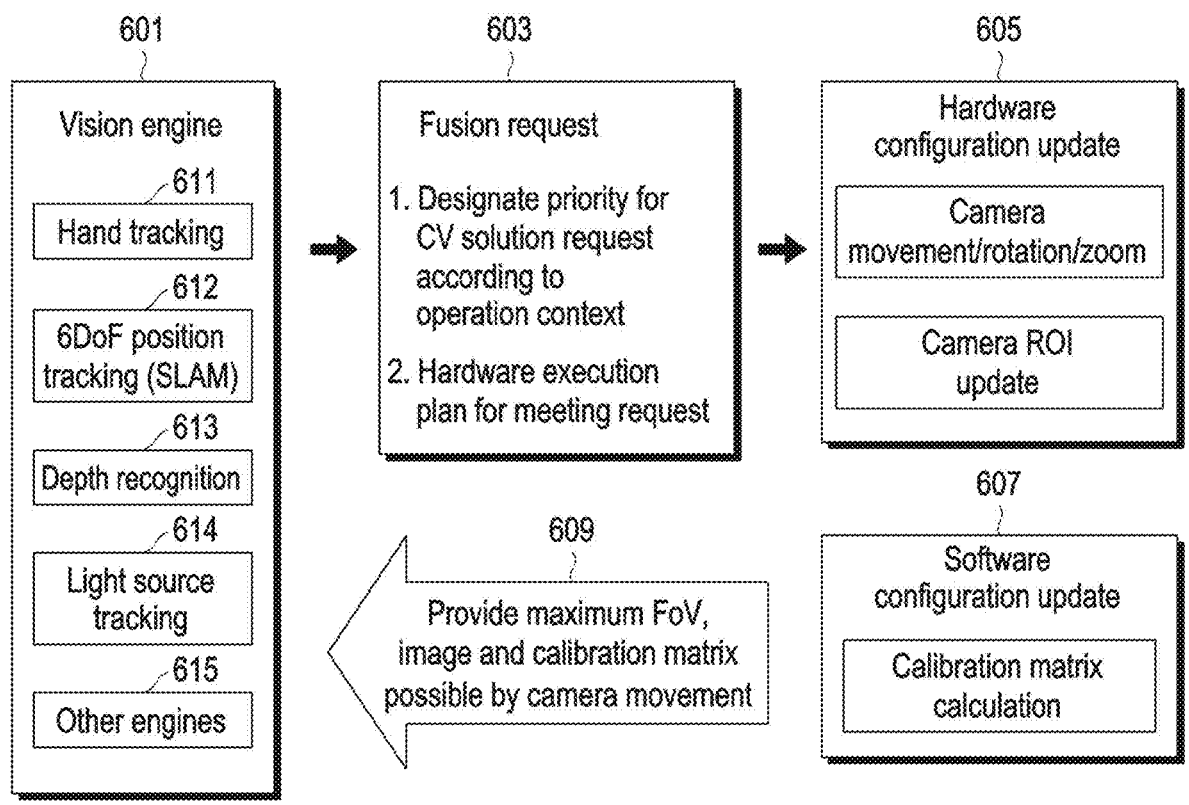
FIG. 6 illustrates an operation of an electronic device according to an embodiment of the disclosure.

FIG. 6 illustrates an operation of an electronic device according to an embodiment of the disclosure.

The electronic device 101 according to some embodiments of the disclosure may utilize computer vision technology in obtaining and processing data. The computer vision system may, for example, identify a task performed by the device and make a quick decision according to the identified content. The performance of the computer vision (CV) solution may be determined by a software component (hereinafter, referred to as a vision engine) that implements an interactive application program having a real-time graphic display function. In the comparative example, the configuration for a single camera or multiple fixed cameras generates the general performance of the vision engine. In other words, it has a single configuration for all CV solutions. The multi-camera system according to an embodiment of the disclosure may provide an optimal CV solution for performing requests of various vision engines in the multi-camera system.

Referring to FIG. 6, in 601, a vision engine may include various contexts constituting a program. For example, the various contexts may include hand tracking (611 of FIG. 6), 6DoF position tracking (simultaneous localization and mapping (SLAM)) (612 of FIG. 6), depth recognition (613 of FIG. 6), light source tracking (614 of FIG. 6), and another engine (615 of FIG. 6).

Referring to FIG. 6, in operation 603, an electronic device 101 of the disclosure may designate priorities for requirements of the vision engine and adjust the multi-camera system in consideration of content operating at each specific time point. For example, the electronic device 101 of the disclosure may receive a request for the CV solution according to the operation context. The electronic device 101 of the disclosure may designate priorities for one or more requests received. As another example, in the electronic device 101 of the disclosure, a hardware execution plan may be established to perform the requests according to priorities.

The requests received by the electronic device 101 of the disclosure may, for example, be processed in a time window that maintains the previously received request and the currently received request. For example, the electronic device 101 of the disclosure may designate priorities for all requests. If the camera of the electronic device 101 of the disclosure moves to a specific area, the movement trajectory may be changed according to current requests. The electronic device 101 of the disclosure may receive an initialization request of the vision engine, and priority may be first assigned to the initialization requests. For example, when there are multiple cameras in the electronic device 101 of the disclosure, the cameras may operate independently for different requests.

In an example, the electronic device 101 of the disclosure may receive requests from different vision engines, and may evaluate the priority of the vision engine in relation to the context of each request for the received requests. In another example, the context executable by the electronic device 101 of the disclosure may include the operation of recognizing the user's gesture for controlling floating virtual objects, the operation of scanning the light source, the operation of performing the SLAM operation or scanning of the depth of a new area, the operation of controlling the virtual object on the table, the operation of scanning the boundary of the field of view to determine whether a hand has entered the field of view, and the operation of showing the object of augmented reality without hand tracking. Among these contexts, the priority logic of executable contexts may be as follows. When the hand tracking request is the top priority, the electronic device 101 of the disclosure may perform hand tracking when the user moves the hand. The electronic device 101 of the disclosure may determine the SLAM operation, the depth scan, and the light source scan as the next priorities. The electronic device 101 of the disclosure may perform hand tracking on the boundary of the area where the scan is performed as the last operation. The electronic device 101 of the disclosure may calculate and set parameters for the camera such that the movement of the camera is performed according to the order of operations performed according to these priorities.

Referring to FIG. 6, in operation 605, the electronic device 101 of the disclosure may update the hardware configuration. For example, the electronic device 101 of the disclosure may update parameters of the camera according to the hardware execution plan for performing the requests. As another example, the electronic device 101 of the disclosure may perform up, down, left, and right movement, rotation, and zooming of the camera, or update of the ROI of the camera.

The electronic device 101 of the disclosure may adjust the camera hardware as the priorities related to the requests for the vision engine are designated. As an example, the electronic device 101 of the disclosure may have one camera and several cameras having different hardware parameters. In the electronic device 101 of the disclosure, the cameras may or may not have a zooming function, and may have different resolutions, fixed focus, or dynamic focus. For example, the cameras of the electronic device 101 of the disclosure may be depth, infrared, and RGB cameras. As another example, the operation of designating priority by the electronic device 101 of the disclosure is based on operations that may be performed on AR/VR glasses, but may be different depending on the target device and the available vision engine. In an example, when the electronic device 101 of the disclosure includes a plurality of cameras, the distribution of the respective roles for the cameras may vary depending on available cameras and may be different from the current description.

For example, in the electronic device 101 of the disclosure, priorities may be set in the order of 1) request for initialization of vision engine 2) context request such as hand tracking or eye tracking, 3) environmental understanding request such as light source tracking or SLAM, and 4) entry into idle state.

The electronic device 101 of the disclosure may identify whether there is a camera capable of performing an operation among the cameras. For example, when there is no camera capable of performing an operation or when some cameras are difficult to use, the electronic device 101 of the disclosure may change the hardware configuration according to the order of high priority. For example, if the zoom function of the camera of the electronic device 101 of the disclosure is required, a camera having a zoom function or a high-resolution camera having an ROI function may be used. Alternatively, the electronic device 101 of the disclosure may use a camera that supports an area capable of scanning the combined FoV. The electronic device 101 of the disclosure may use a camera having an available moving and rotating speed by changing a required time point. Further, in the electronic device 101 of the disclosure, the front camera or the eye tracking camera may use the same application programming interface (API) for the combined FoV. Further, the electronic device 101 of the disclosure may transmit an error message indicating an impossible request to the vision engine.

In an example, if the electronic device 101 of the disclosure identifies that the camera is a camera that may perform operations, it may be identified whether the operations are operations in which the requests may be performed. In another example, when it is determined that the requests may not be performed, the electronic device 101 of the disclosure may request the vision engine to delete the request having the highest priority. Further, the electronic device 101 of the disclosure may transmit an error to the vision engine.

When it is identified that the operations of the received requests are operations capable of being performed by the camera, the electronic device 101 of the disclosure may plan the movement, rotation, and zoom of the camera according to the request. For example, the electronic device 101 of the disclosure may plan to control the movement, rotation, and zoom operation of the camera to view a required area (x-axis, y-axis, width, height, etc.).

Referring to FIG. 6, in operation 607, the electronic device 101 of the disclosure may update the software configuration. The electronic device 101 of the disclosure may, for example, calibrate the updated hardware that performs the requests and correct the parameters. For example, the electronic device 101 of the disclosure may update the software configuration by calculating a matrix for correction.

Referring to FIG. 6, in operation 609, the electronic device 101 of the disclosure may provide the vision engine with a maximum FoV (e.g., 410 of FIG. 4) possible by the movement of the camera and updates for the calibration matrix and image.

Figure 7:
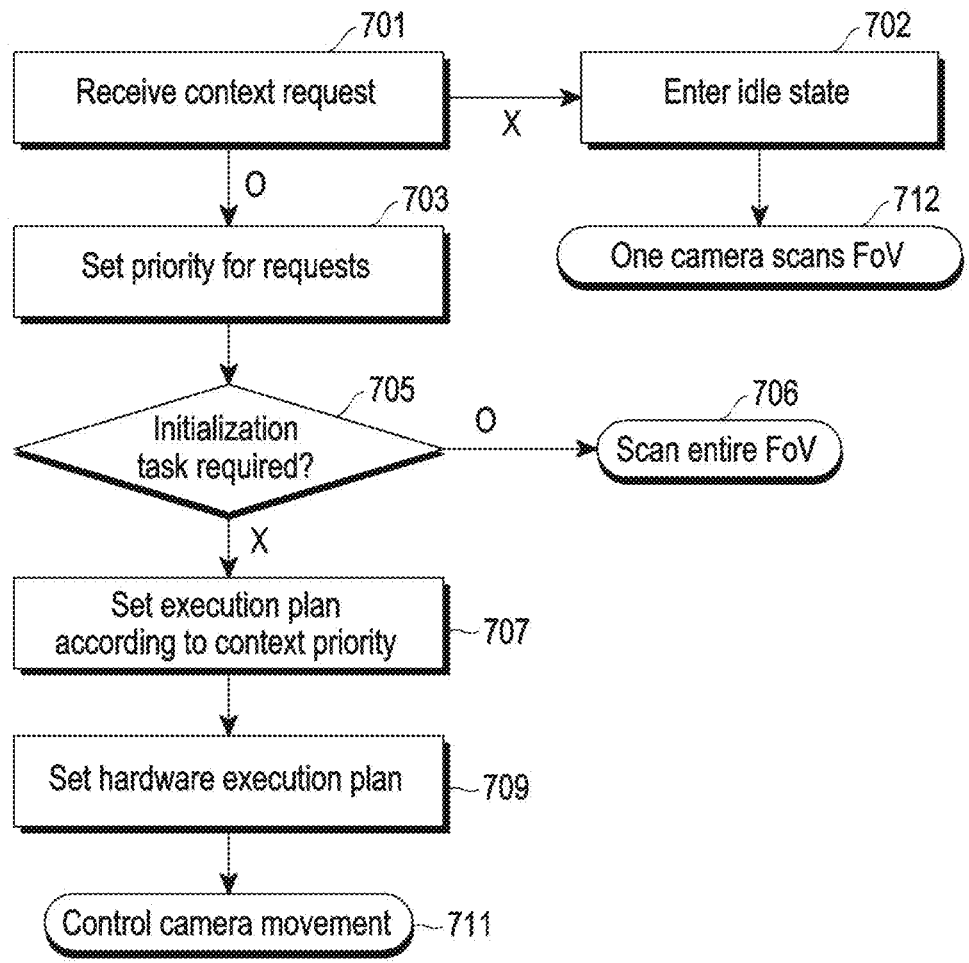
FIG. 7 illustrates an operation of an electronic device according to an embodiment of the disclosure.

FIG. 7 illustrates an operation of an electronic device 101 according to an embodiment of the disclosure.

Referring to FIG. 7, in operation 701, the electronic device 101 of the disclosure may receive a context request. For example, the description of FIG. 6 may be applied to the context request.

Referring to FIG. 7, in operation 702, the electronic device 101 of the disclosure may enter an idle state when a context request is not received. As an example, the electronic device 101 of the disclosure may operate such that only one of several cameras scans the entire FoV for power efficiency. As another example, the electronic device 101 of the disclosure may turn off the camera when there is no request for a predetermined time, and one camera may continuously scan the combined FoV (e.g., 712 of FIG. 7) to obtain new information. Power consumption may be enhanced while maintaining the same function as operating a plurality of cameras. For example, when one of the plurality of cameras included in the electronic device 101 of the disclosure is turned on, the camera may scan the entire FoV while moving up, down, left and right and/or rotating. In the electronic device 101 of the disclosure, the camera may transfer calculation and calibration data of the matrix to the vision engine while scanning the FoV.

In an embodiment, the cameras of a mobile device may use a large amount of energy in total power consumption. In the electronic device 101 according to an embodiment of the disclosure, while performing the hand tracking operation, the hand may be at a specific position of the image frame and may quickly move to the left or right. In this case, since the camera needs to track the hand quickly, power consumption may increase if a wide area is continuously inspected. Power may be reduced by obtaining visual information in a specific area of the camera using the ROI function of the camera. For example, the operation method of the electronic device for hand tracking may be requested by the vision engine.

Referring to FIG. 7, in operation 703, when receiving a context request, the electronic device 101 of the disclosure may set priorities for one or more context requests. For example, for the priority of the context request, refer to the description of FIG. 6.

Referring to FIG. 7, in operation 705, the electronic device 101 of the disclosure may identify whether it is necessary to initialize the vision engine.

In an example, in a comparative example, the quality of the vision engine depends on the environment in which the user performs initialization or correction for the vision solution. In another example, the vision engine for 6DoF position tracking (SLAM) and depth recognition requires the user's movement for spatial scanning and algorithm initialization/correction. As such, it may be inconvenient for the user to slowly move forward/backward and left/rightward for spatial scanning and correction. According to an embodiment of the disclosure, camera movement and rotation guided to request various vision engines may be supported, and movement of a scan camera may be supported for environmental scanning required for initialization of the vision engine. For example, the quality of the vision engine may vary depending on the distance and the field of view.

For example, the 6DoF position tracking (SLAM) and depth recognition vision engine require a large area (wide FoV) and high-quality features for estimating an ambient area. Since the accuracy of the hand tracking technology varies depending on the distance to the hand, a zooming function is required. For example, a liquid lens may be used for the zooming function. This lens may change the optical parameter (e.g., focal length) and consequently change the essential matrix. The liquid lens may dynamically change the rotation of the liquid crystal molecule having the same effect as the change in refractive index through voltage control. Zooming provides the ability to obtain high-quality features when viewed closer and may increase FoV in a wide-angle view. Therefore, according to an embodiment of the disclosure, camera zooming for enhancing visual engine accuracy by increasing FoV and zooming to a necessary object may be supported.

Referring to FIG. 7, in operation 706, the electronic device 101 of the disclosure may perform initialization task of the vision engine.

When an initialization task of the vision engine is requested, it may be processed before other requests. For example, the initialization task may enhance the user experience by enhancing the initialization speed of all vision engines. For example, other requests may be ignored during the initialization operation.

Referring to FIG. 7, in operation 707, the electronic device 101 of the disclosure may set an execution plan according to the context priority.

When the initialization task of the vision engine is completed or is not necessary, one or more context requests may be received from the vision engine. The electronic device 101 of the disclosure may establish an execution plan to perform one or more context requests according to priorities.

Referring to FIG. 7, in operation 709, the electronic device 101 of the disclosure may set a hardware execution plan according to the context priority.

For example, the electronic device 101 of the disclosure may set an optimal device configuration to sequentially perform context operations.

Referring to FIG. 7, in operation 711, the electronic device 101 of the disclosure may control the movement of the camera according to the set hardware configuration.

The electronic device 101 of the disclosure may calculate a trajectory to be scanned for the combined FoV. For example, the electronic device 101 of the disclosure may include two cameras, and may calculate a trajectory for hand tracking and SLAM requests appearing in the combined FoV. For example, in the electronic device 101 of the disclosure, if the user moves the head to the left, a new area that is not scanned may be generated, and the new area may be scanned with one camera. At the same time, another camera may keep tracking the right hand. In another example, in the electronic device 101 of the disclosure, in order to calculate the trajectory for hand tracking with two cameras appearing in the combined FoV, e.g., the right camera may perform hand tracking, and the left camera may scan the edge to capture the moment when the left hand appears. In the electronic device 101 of the disclosure, the portion scanned by the right camera may not be scanned by the left camera.

Figure 8A:
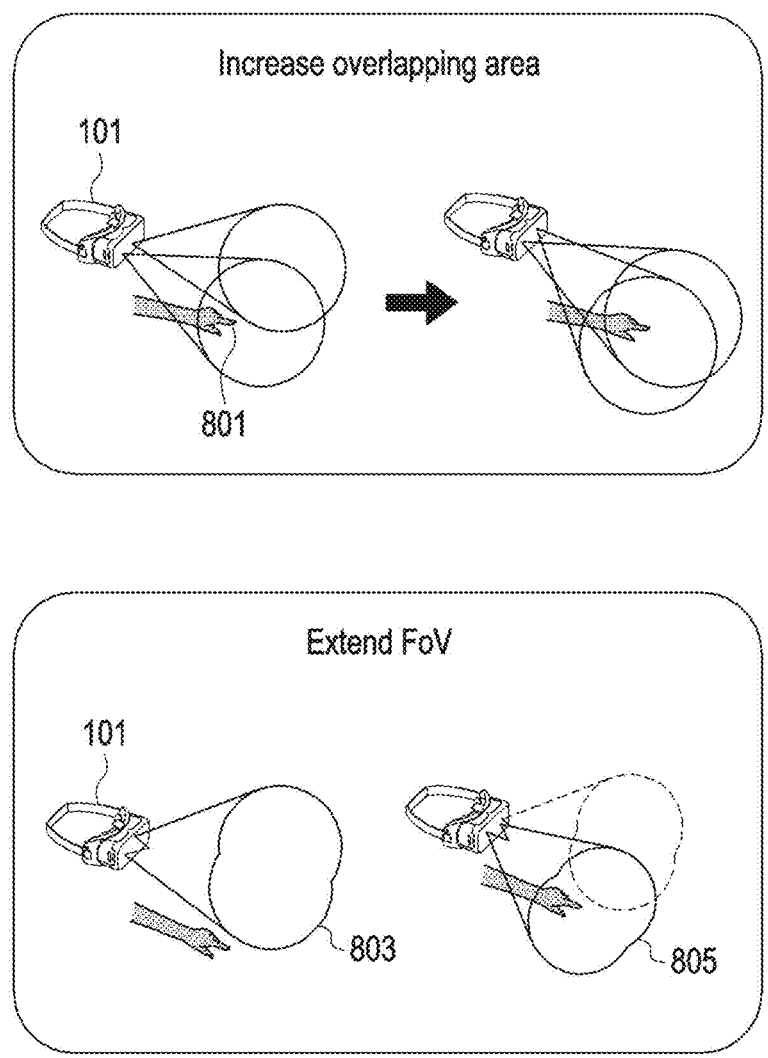
FIG. 8A illustrates maintaining a target object in a crossed area by a plurality of cameras in an electronic device according to an embodiment of the disclosure.

FIG. 8A illustrates maintaining a target object in a crossed area by a plurality of cameras in an electronic device according to an embodiment of the disclosure.

Figure 8B:
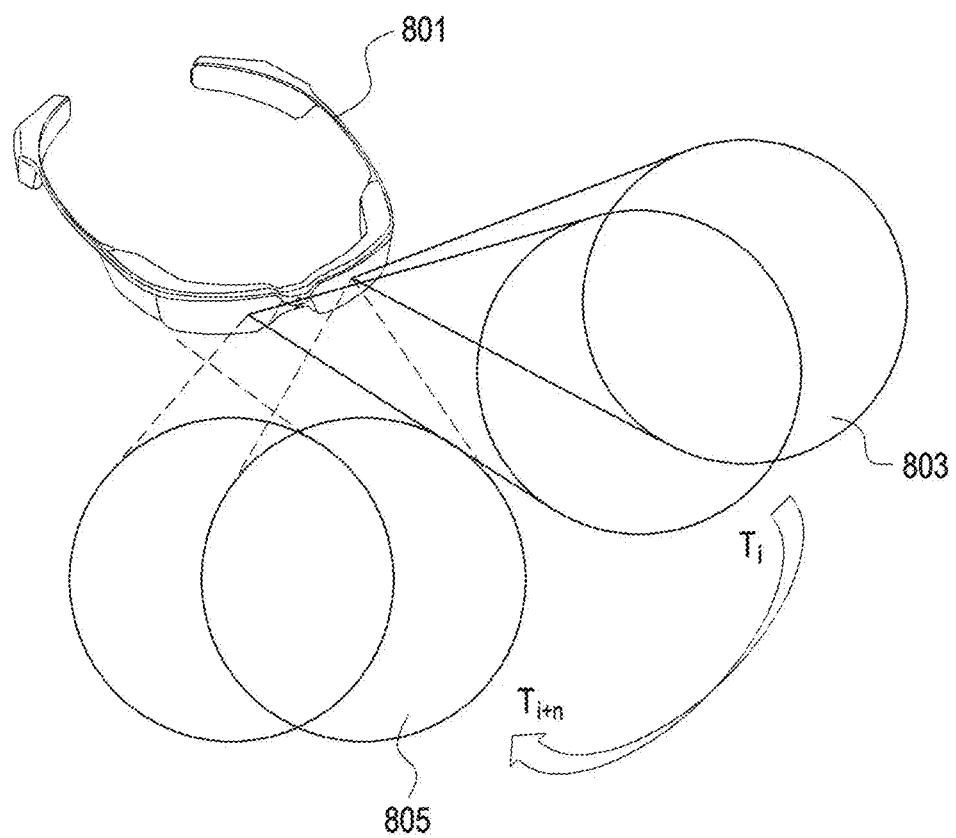
FIG. 8B illustrates an extended FoV by rotation of a camera in an electronic device according to an embodiment of the disclosure.

FIG. 8B illustrates an extended FoV by rotation of a camera in an electronic device according to an embodiment of the disclosure.

FIG. 8A illustrates an operation in which a camera maintains an object (hereinafter, referred to as a hand) 810 in a crossed FoV of a camera system using some implementations of a method proposed in the disclosure in an electronic device 101 according to an embodiment of the disclosure.

The electronic device 101 according to an embodiment of the disclosure may perform a hand tracking operation. The hand is a target object (or object), and may be referred to as an example of an object for convenience of description. For example, the electronic device 101 includes a plurality of cameras. In another example, the movement and rotation of the camera may be controlled according to the movement of the hand through the image by the left camera and the image by the right camera included in the electronic device 101. For example, the right boundary of the image by the left camera and the hand may touch (intersect) each other. The left camera of the electronic device 101 may be rotated to the right. If the left boundary of the image of the right camera and the hand touch each other, the right camera may be rotated to the left.

Referring to FIG. 8A, in the electronic device 101 including a plurality of cameras according to an embodiment of the disclosure, the hand 810 may be positioned in the FoV combined by the plurality of cameras, but the hand 810 may not be positioned in the overlapping portion. When the hand 810 moves and touches the boundary of the left camera, the left camera of the electronic device 101 of the disclosure may move to the right to increase the overlapping portion. Alternatively, in the electronic device 101 including the plurality of cameras according to an embodiment of the disclosure, although the hand 810 is not included in the FoV 803 combined by the plurality of cameras, but the hand 810 is not scanned, a new FoV 805 may be formed by moving the camera, and the hand 810 may be recognized in the new FoV 805.

Referring to FIG. 8B, the FoV by the multiple cameras included in the electronic device 101 according to an embodiment of the disclosure may be changed from Ti to Ti+n. When the electronic device 101 is a wearable device, the left camera and/or the right camera may be rotated up, down, left, and right, even if the user does not consciously move the camera. The combined FoV formed by the plurality of cameras at the time point Ti may be moved to scan the object 801 at the time point Ti+n. The object 801 may be positioned in the overlapping area by the plurality of cameras, and may continue to be positioned in the overlapping area even if the object 801 moves. According to one embodiment of the disclosure, multiple cameras included in the electronic device 101 of the disclosure may be moved and/or rotated so that the object 801 may be positioned in the overlapping area. As a result, it is possible to enhance the user experience by increasing the interaction area for recognizing gestures such as user hand tracking.

In the electronic device 101 according to an embodiment of the disclosure, a method of adjusting adaptive multiple cameras may affect several computer vision solutions. According to the request of the vision engine, it may be necessary to designate priorities for requests and analyze operation context. For example, the electronic device 101 of the disclosure may control parameters related to multiple cameras to obtain an optimal parameter configuration capable of simultaneously performing multiple requests received from the vision engine. Considering that requests (e.g., CV solutions) from the vision engine are simultaneously performed, the electronic device 101 of the disclosure may provide a more enhanced function than the comparative example through the adaptive multi-camera system. For example, the CV solutions may include hand understanding (e.g., hand sensing, hand tracking, gesture recognition, etc.), scene understanding (depth recognition, plane estimation, geometry estimation, 3D model reconstruction, etc.), position understanding (6DoF position tracking, SLAM, route planning, etc.), gaze tracking (eye detection, eye tracking, gaze direction determination, etc.), urban environment understanding (dynamic environment analysis, pedestrian tracking, vehicle speed, etc.), and a plurality of other solutions (object tracking, light source estimation, etc.).

Figure 9A:
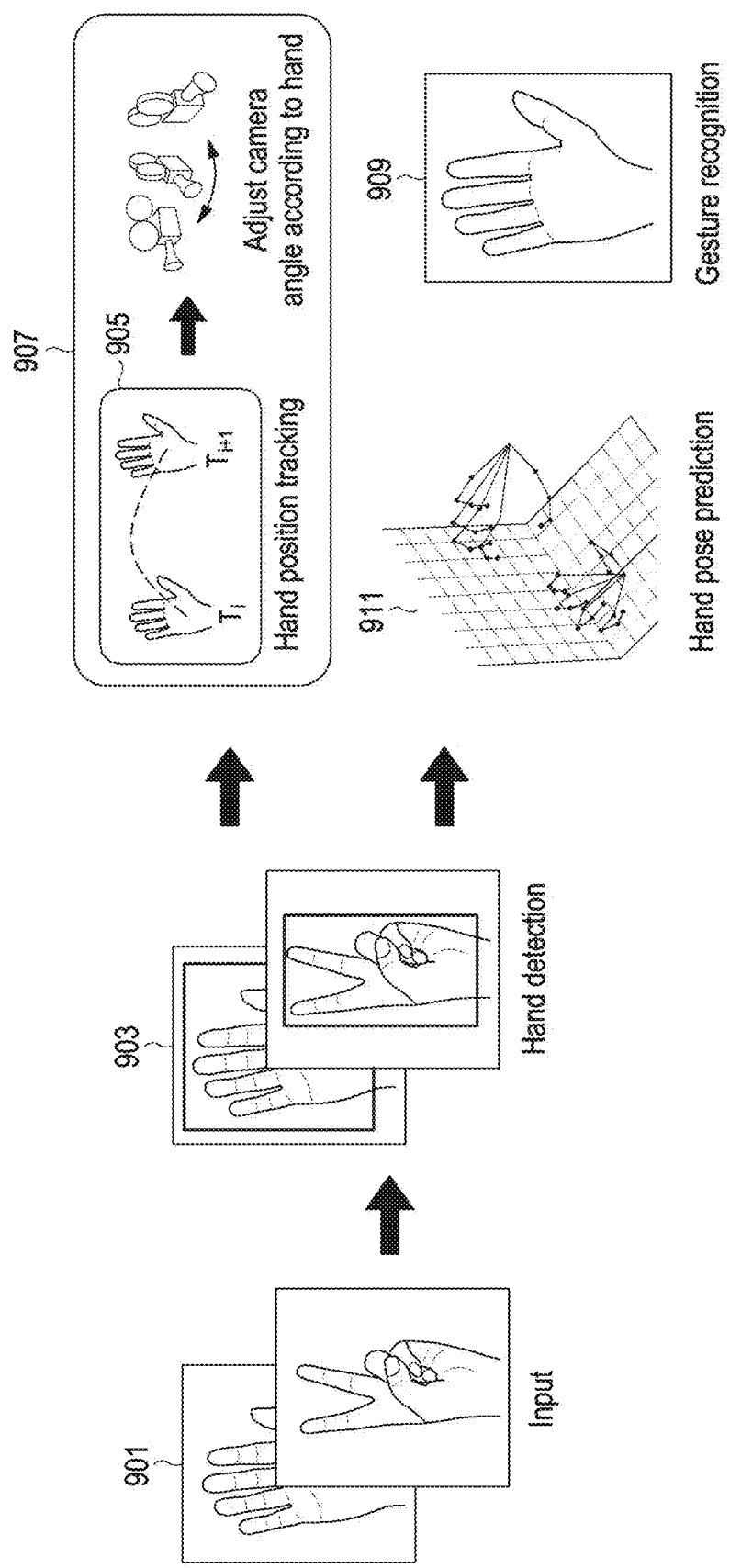
FIG. 9A illustrates an operation of tracking a hand position in an electronic device according to an embodiment of the disclosure.

FIG. 9A illustrates an operation of tracking a hand position in an electronic device according to an embodiment of the disclosure.

FIG. 9A illustrates an operation of detecting a hand using a video and/or image in color and/or grayscale in an electronic device 101 of the disclosure (e.g., 901 and 903 of FIG. 9A) according to an embodiment of the disclosure.

As an example, the electronic device 101 according to an embodiment of the disclosure may identify whether a hand is present in the overlapping area with the hand taken as an object (or target) from a vision engine including an engine for hand gesture recognition. The hand may be an ROI. For example, the movement of the multiple cameras included in the electronic device 101 of the disclosure may be controlled such that the object is included in the overlapping area. For example, the vision engine may be initialized before the electronic device 101 of the disclosure operates according to a request. A specific movement of the camera may be identified during initialization of the vision engine. As another example, in the electronic device 101 of the disclosure, the movement of the camera for spatial scanning may be performed in correcting and/or initializing the algorithm in the initialization process of the vision engine(e.g., 907 of FIG. 9A). In the electronic device 101 according to an embodiment of the disclosure, the FoV may be changed from the FoV (e.g., 803 of FIG. 8B) combined by multiple cameras to an FoV (e.g., 805 of FIG. 8B) newly combined by multiple cameras controlled to track the position of the hand (e.g., 905 of FIG. 9A). Here, the multiple cameras may be controlled such that the camera angle is adjusted according to the movement of the object.

In the electronic device 101 according to an embodiment, when the left hand is detected in the image of the left camera, the camera may be moved, rotated, and/or zoomed to view only the detected hand. For example, when the right hand moves to the left in the image of the right camera, the camera may be moved so that the entire hand is visible. As another example, the movement of the camera may be performed independently.

In the electronic device 101 according to an embodiment of the disclosure, after the camera moves to identify the detected hand, the next operation may be performed according to the priority. The scenario possible as the next operation may include a case in which a request other than the hand tracking request is not received from the vision engine, a case in which the hand tracking request is a top priority, or a case in which a movement of the camera is not required even when another request is received. For example, in the electronic device 101 according to an embodiment of the disclosure, the detected hand may be identified, and the position of the multiple cameras may be calculated to perform the requested operation when the motion of the camera is required, such as when the next operation is requested by the vision engine even after the camera moves, or when the motion of the camera is required, such as when the hand moves. According to an embodiment of the disclosure, related parameters may be calibrated to control the position of multiple cameras.

In the electronic device 101 according to an embodiment of the disclosure, a wider FoV overlapping area may be formed by the multiple cameras, an interaction for accurate 3D hand understanding may be possible in the overlapping area in the FoV modified through movement, and a user experience may be enhanced as the combined donor FoV is extended.

The multi-camera included in the electronic device 101 according to an embodiment of the disclosure may scan feature points by varying the entire FoV. The electronic device 101 according to an embodiment of the disclosure may determine the feature point as an ROI and track the ROI to perform hand pose prediction (e.g., 911 of FIG. 9A) and gesture recognition (e.g., 909 of FIG. 9A).

Figure 9B:
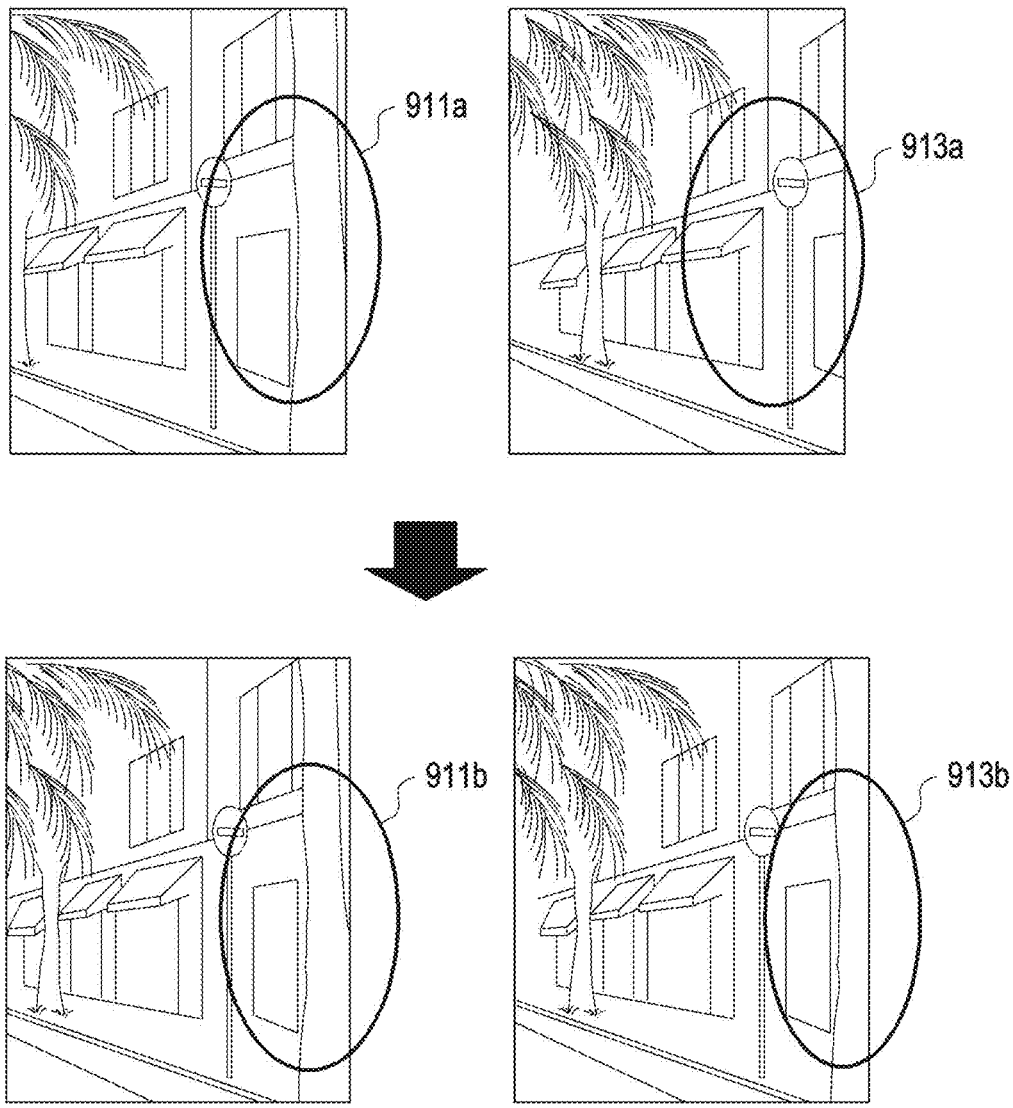
FIG. 9B illustrates that an overlapping area by a plurality of cameras is extended in an electronic device, as compared with a comparative example according to an embodiment of the disclosure.

FIG. 9B illustrates that an overlapping area by a plurality of cameras is extended in an electronic device according to an embodiment of the disclosure, as compared with a comparative example.

In the electronic device 101 according to an embodiment of the disclosure, the user experience may be increased by recognizing the depth of the surrounding environment or adjusting a multi-camera system to configure a 3D screen. According to an embodiment of the disclosure, when the electronic device 101 is an HMD, it is possible to analyze a wider volume in a scene with minimal head rotation than in a comparative example. According to an embodiment of the disclosure, the electronic device 101 may scan a wide range while extending the combined FoV without explicitly rotating the head for environment scanning.

Referring to FIG. 9B, different vision engines (e.g., accuracy depth recognition and hand pose estimation by stereo images) may need overlapping intervals.

Referring to 911a and 913a of FIG. 9B, in the electronic device 101 of the disclosure including multiple cameras, it may be identified that FoVs of two images by both cameras are different. When the FoVs of the two images are different, it may mean that the overlapping area is not large. Referring to 911b and 913b of FIG. 9B, a left camera included in the electronic device 101 of the disclosure may be zoomed out. The same FoV may be obtained from the two images by both cameras, and it may be identified that the overlapping area is increased.

Figure 9C:
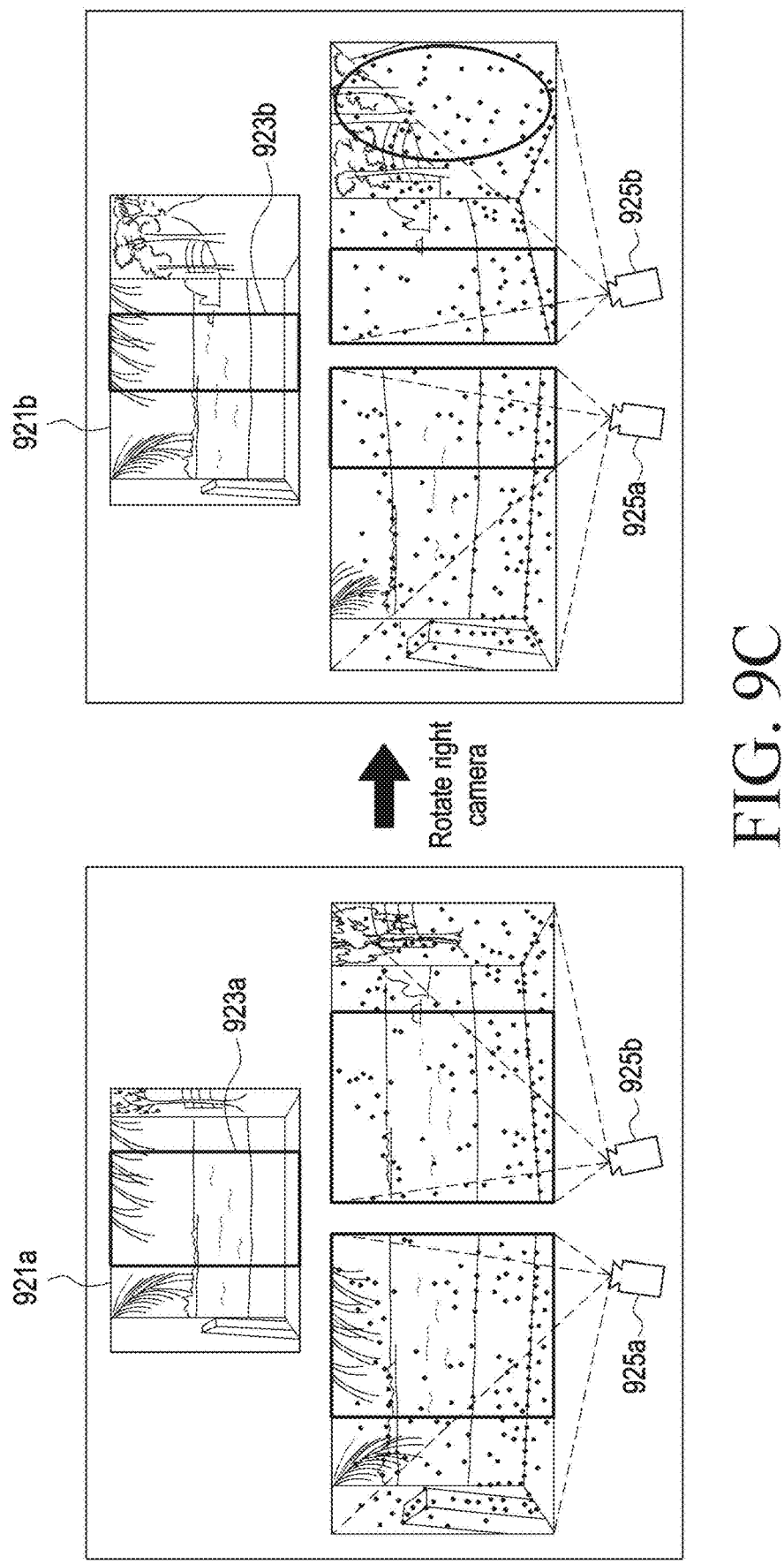
FIG. 9C illustrates that an entire FoV by a plurality of cameras is extended in an electronic device as compared with a comparative example according to an embodiment of the disclosure.

FIG. 9C illustrates that a FoV is extended as a camera moves in an electronic device according to an embodiment of the disclosure.

In the electronic device 101 according to an embodiment of the disclosure, FoV by multiple cameras is illustrated when SLAM is performed. For example, it may be advantageous to have a wide FoV by multiple cameras to perform SLAM. Here, the wide FoV may increase an overlapping area between images scanned by the multiple cameras. The target (e.g., landmark) may be tracked for a longer period of time. As a result, it is possible to estimate a robust pose during a fast motion. For example, as the number of targets tracked in the overlapping area by the multiple cameras increases, the SLAM accuracy may increase, and the estimation of the pose may be stabilized. The trajectory of the camera may be determined according to the movement of the target ROI generated. As another example, the electronic device 101 according to an embodiment of the disclosure may adjust the overlap interval when the target ROI is determined, and the corrected overlap interval may be used in a scene including an appropriate number of moving objects. For example, when the electronic device 101 according to an embodiment of the disclosure is used in a crowded road or a densely populated area, buildings, cars, pedestrians, and the like may be more accurately identified.

Referring to FIG. 9C, the electronic device 101 according to an embodiment may include multiple cameras (e.g., 925a and 925b of FIG. 9C), and may form an overlapping area (e.g., 923a of FIG. 9C) in a FoV (e.g., 921a of FIG. 9C) combined by the multiple cameras. When the right camera 925a of the electronic device 101 rotates to the right, it may be identified that the entire FoV is extended from 921a to 921b and the overlapping area is reduced from 923a to 923b as a scannable area is added. In an example, when the electronic device 101 according to an embodiment of the disclosure receives a context for an operation requiring a wide FoV, such as a SLAM operation, from the vision engine, the electronic device 101 may control the at least one camera to rotate. The electronic device 101 according to an embodiment of the disclosure may secure a wider FoV to enhance estimation of position tracking (SLAM).

Figure 9D:
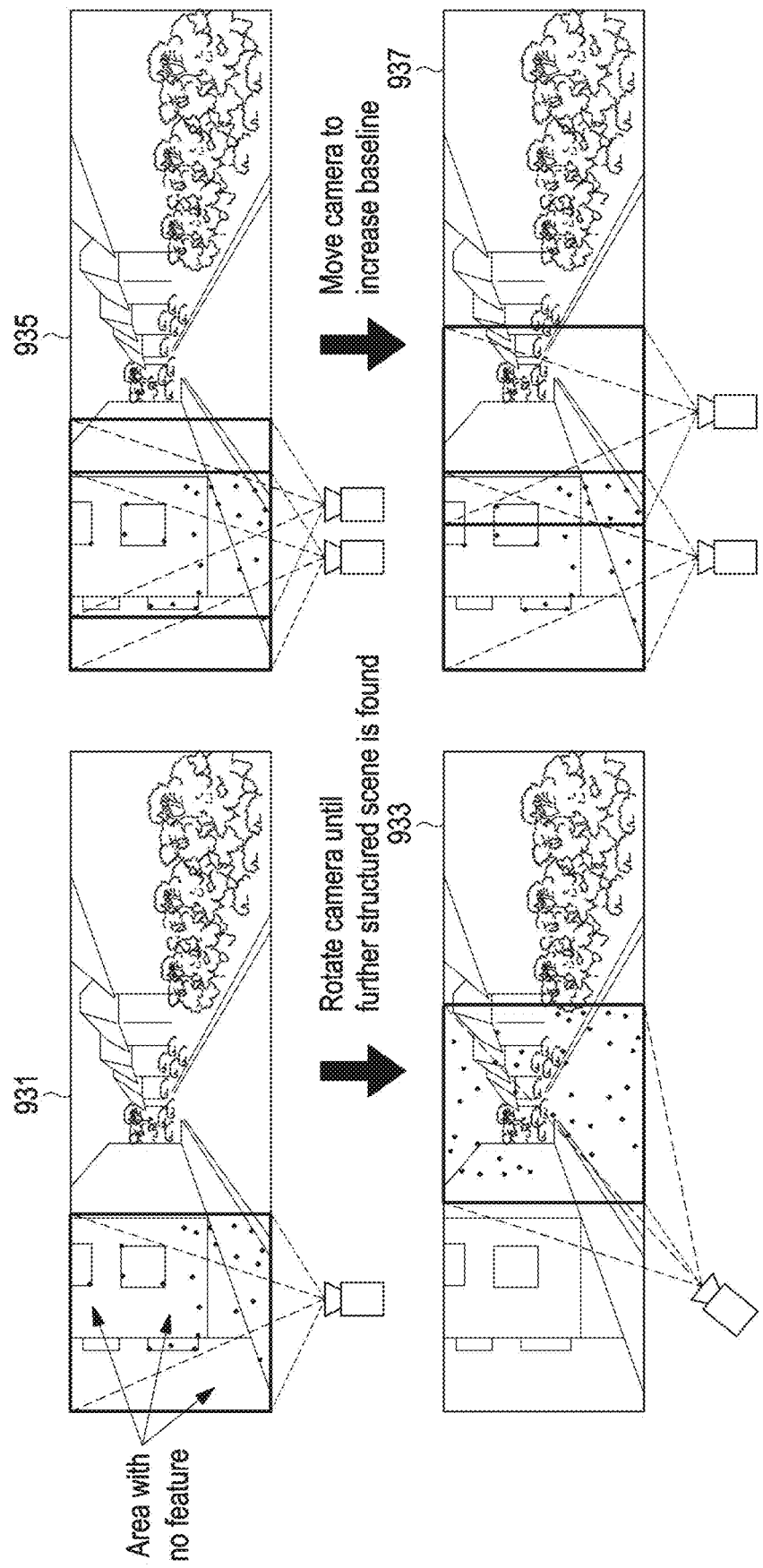
FIG. 9D illustrates extension of an FoV for recognizing a structure when operated by a plurality of cameras in an electronic device according to an embodiment of the disclosure.

FIG. 9D illustrates extension of an FoV for recognizing a structure when operated by a plurality of cameras in an electronic device according to an embodiment of the disclosure.

In the electronic device 101 according to an embodiment of the disclosure, when it is difficult to track the position of the target, the visibility of the scene may be enhanced by changing the overlapping area of the multiple cameras. For example, referring to 931 and 933 of FIG. 9D, when the electronic device 101 includes only a single camera or includes multiple cameras that do not rotate independently, the area of FoV by the camera may be determined. In another example, when a portion having no feature is scanned with a limited FoV, the camera may be rotated to find the feature point. However, a feature point may be found in the FoV of the area moved by the limited FoV area, but since it deviates from the area before moving, it may be difficult to find the feature point that could be found in the original area. For example, in 931 of FIG. 9D, the area in the FoV may be a building, but it may be said that the feature point of the building has not been found. However, in 933 of FIG. 9D, the camera may be rotated until a feature point (structured scene) is found. As shown in 933 of FIG. 9D, the road may be recognized as a feature point, but the building may not be recognized as a feature point before the camera rotates.

For example, in 935 of FIG. 9D, the electronic device 101 according to an embodiment may scan a scene in a wide overlapping area using the multi-camera system, but may not recognize a building. The electronic device 101 according to an embodiment of the disclosure may extend the FoV by moving at least one camera.

For example, in 937 of FIG. 9D, the right camera may partially move to the right. The overlapping area by the multiple cameras may be reduced, but the building and the road may be simultaneously scanned by the extended FoV. Since the building distinguished from the road may be identified, the electronic device 101 according to an embodiment of the disclosure may identify the building, unlike the comparative example. The electronic device 101 according to an embodiment of the disclosure may find a structured scene by changing the crossing area and enhancing visibility by moving the camera as compared to the comparative example. For example, the electronic device 101 according to an embodiment of the disclosure may extend the overlapping area after finding the structured scene.

Figure 9E:
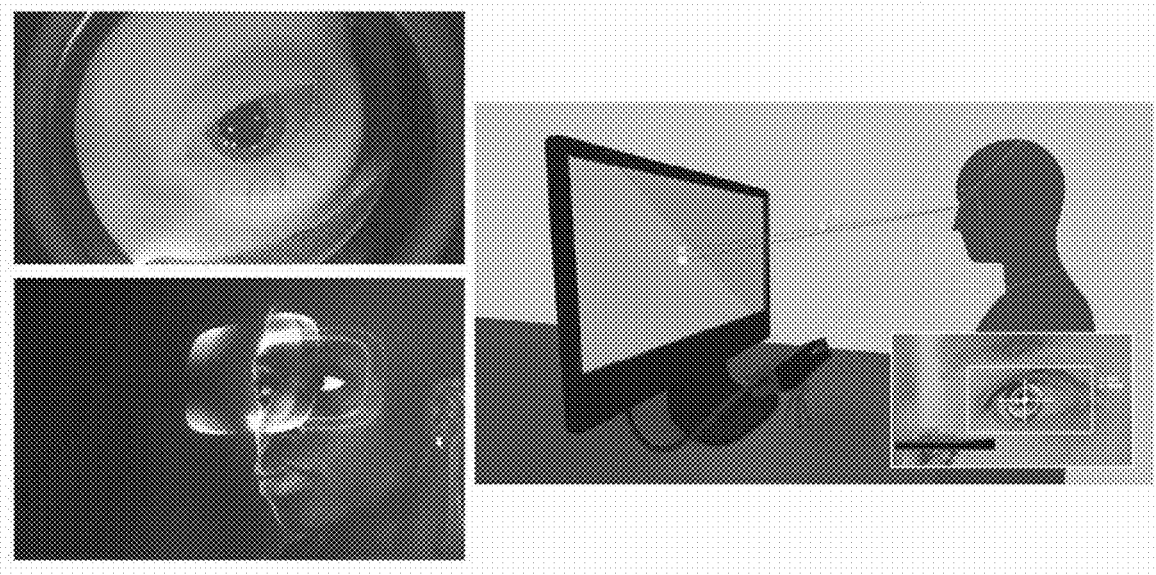
FIG. 9E illustrates performing gaze tracking in an electronic device according to an embodiment of the disclosure.

FIG. 9E illustrates performing gaze tracking in an electronic device according to an embodiment of the disclosure.

For example, in the electronic device 101 according to an embodiment of the disclosure, if the eye tracking system is enhanced within the extended operating range by the new FoV for AR/VR headsets, the immersion experience may be more natural due to vivid eye movements. In another example, in the AR/VR headset, the system (TV, notebook, etc.) needs to process a free head movement that blurs the focus of the camera image. When the operating range of the eye tracking system is extended, a clear eye image may be obtained in a wide operating range. The electronic device 101 according to an embodiment of the disclosure may provide a realistic augmented reality/virtual reality to the user by extending the FoV area and/or extending the overlapping area.

Figure 10:
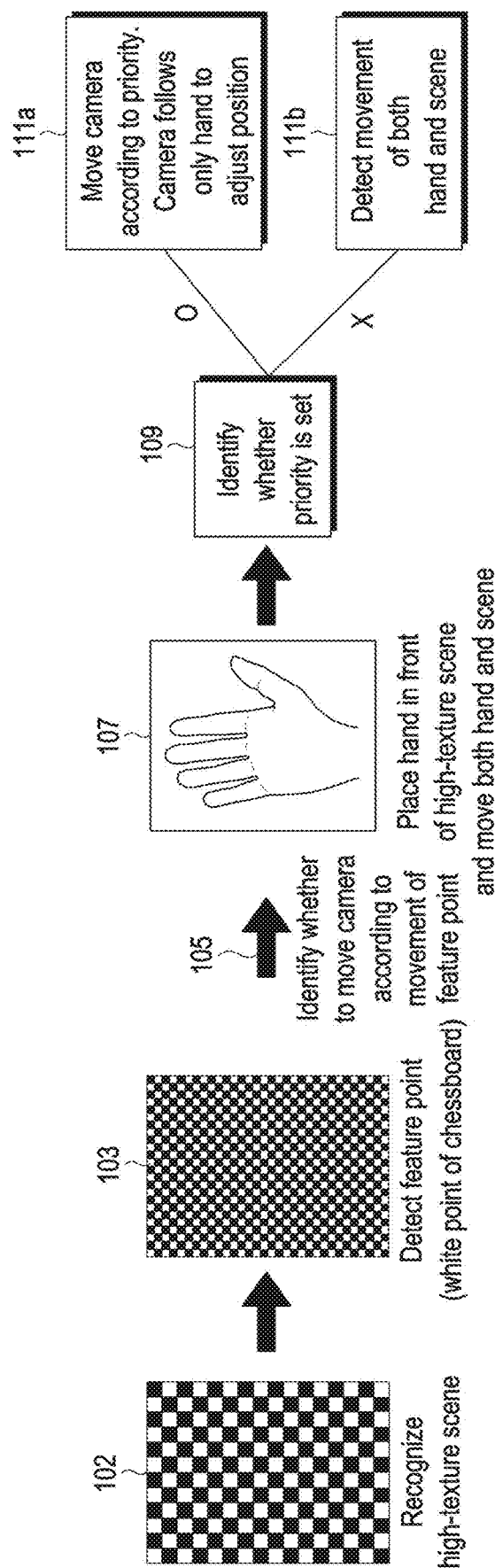
FIG. 10 illustrates a camera control operation by priority in an electronic device according to an embodiment of the disclosure.

FIG. 10 illustrates a camera control operation by priority in an electronic device according to an embodiment of the disclosure.

Referring to 102 of FIG. 10, an electronic device 101 according to an embodiment of the disclosure may first recognize a scene. For example, the scene may be a background in which no object appears, and may be a high-texture scene as expressed as a chessboard illustrated in FIG. 10.

Referring to 103 of FIG. 10, the electronic device 101 according to an embodiment of the disclosure may detect, e.g., any one of white points on the chessboard as a feature point. The multiple cameras included in the electronic device 101 according to an embodiment of the disclosure may scan a feature point by changing the entire FoV.

Referring to 105 of FIG. 10, when the feature point moves, the electronic device 101 according to an embodiment of the disclosure may determine the feature point as an ROI and track the ROI. For example, tracking of the ROI may be hand tracking, gesture recognition, position tracking, or depth tracking described above. According to an embodiment, the multiple cameras may enhance the interaction area (ROI) with the object and the recognition accuracy of the object.

Referring to 107 of FIG. 10, the electronic device 101 according to an embodiment of the disclosure needs to control multiple cameras in a situation where there is an object (e.g., a hand) in front of the high-texture scene, and the scene and the object move simultaneously.

Referring to 109 of FIG. 10, the electronic device 101 according to an embodiment of the disclosure may identify whether a priority is set in a situation where the scene and the object move simultaneously.

Referring to 111a of FIG. 10, when a priority is set, the electronic device 101 according to an embodiment may control the camera according to the priority. When the movement of the object has a higher priority than the movement of the scene, at least one camera may be controlled to follow the object.

Referring to 111b of FIG. 10, in the electronic device 101 according to an embodiment of the disclosure, when the priority is not set, both the movement of the object and the movement of the scene may be detected.

A wearable electronic device according to an embodiment of the disclosure may be configured to comprise a transceiver, a plurality of cameras, and at least one processor.

The at least one processor included in the electronic device according to an embodiment of the disclosure may be configured to receive, through the transceiver, a plurality of operation contexts for the wearable electronic device to perform an operation according to an operation context.

The at least one processor may be configured to designate a priority between the plurality of operation contexts.

The at least one processor may be configured to control a parameter related to a movement of the plurality of cameras to perform an operation context having a top priority.

The at least one processor according to an embodiment of the disclosure may be configured to change a combined field-of-view (FoV) and overlapping area formed by the plurality of cameras based on the movement of the plurality of cameras.

The plurality of cameras are configured to move, independently. The at least one processor according to an embodiment of the disclosure may be configured to allow each of the plurality of cameras to independently perform movement, rotation, and zooming.

The at least one processor may be configured to initialize the parameter before operating the operation context having the top priority.

The at least one processor may be configured to perform calibration on a configuration of the parameter to perform the operation context having the top priority.

The at least one processor according to an embodiment of the disclosure may be configured to, when the plurality operation contexts are not received within a predetermined time, regard the wearable electronic device as being in an idle state and allow one of the plurality of cameras to scan an entire FoV.

The at least one processor may be configured to, in a situation where a structure of a scene is to be recognized, move the plurality of cameras to extend the combined FoV.

In the electronic device according to an embodiment of the disclosure, the at least one processor may be configured to control each of the plurality of cameras including a left camera and a right camera to perform at least one of rotating the left camera to a left, moving the left camera to the left, rotating the right camera to a right, and moving the right camera to the right to extend the combined FoV.

The at least one processor may be configured to, in a situation where a specific object is to be tracked, move the plurality of cameras to extend the overlapping area so that the specific object is included in the overlapping area.

In the electronic device according to an embodiment of the disclosure, the at least one processor may be configured to control each of the plurality of cameras including a left camera and a right camera to perform at least one of rotating the left camera to a right, moving the left camera to the right, rotating the right camera to a left, and moving the right camera to the left to extend the overlapping area.

The at least one processor may be configured to, in a situation where a specific object is not scanned in the combined FoV, control the movement of the plurality of cameras so that the combined FoV moves to the specific object.

In the electronic device according to an embodiment of the disclosure, the at least one processor may be configured to control each of the plurality of cameras including a left camera and a right camera to rotate or move the left camera and/or the right camera in the same direction so that the combined FoV moves to the specific object.

A method by an electronic device may comprise receiving a plurality of operation contexts for the wearable electronic device to perform an operation according to an operation context.

The method by the electronic device according to an embodiment of the disclosure may comprise designating a priority between the plurality of operation contexts.

The method by the electronic device may comprise calculating a parameter related to a movement of a plurality of cameras to perform an operation context having a top priority.

The method by the electronic device according to an embodiment of the disclosure may comprise changing a combined field-of-view (FoV) and overlapping area formed by the plurality of cameras based on the movement of the plurality of cameras.

The method by the electronic device according to an embodiment of the disclosure, the plurality of cameras are configured to moved, independently.

The method by the electronic device according to an embodiment of the disclosure, a movement, rotation, and zooming of each of the plurality of cameras may be independently performed.

The method by the electronic device may comprise initializing the parameter before operating the operation context having the top priority.

The method by the electronic device may further comprise performing calibration on a configuration of the parameter to perform the operation context having the top priority.

The method by the electronic device according to an embodiment of the disclosure may further comprise, when the plurality operation contexts are not received within a predetermined time, regarding the wearable electronic device as being in an idle state and allowing one of the plurality of cameras to scan an entire FoV.

The method by the electronic device may comprise, in a situation where a structure of a scene is to be recognized, moving the plurality of cameras to extend the combined FoV.

The method by the electronic device according to an embodiment of the disclosure may comprise, in the plurality of cameras including a left camera and a right camera, performing at least one of rotating the left camera to a left, moving the left camera to the left, rotating the right camera to a right, and moving the right camera to the right to extend the combined FoV.

The method by the electronic device may comprise, in a situation where a specific object is to be tracked, moving the plurality of cameras to extend the overlapping area.

The method by the electronic device may comprise, in the plurality of cameras including a left camera and a right camera, performing at least one of rotating the left camera to a left, moving the left camera to the left, rotating the right camera to a right, and moving the right camera to the right to extend the overlapping area.

The method by the electronic device according to an embodiment of the disclosure may further comprise, in a situation where a specific object is not scanned in the combined FoV, moving the plurality of cameras so that the combined FoV moves to the specific object; and The method by the electronic device may comprise, in the plurality of cameras including a left camera and a right camera, rotating or moving the left camera and/or the right camera in the same direction to move the combined FoV.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
a transceiver;
a plurality of cameras; and at least one processor,
wherein the at least one processor is configured to:
receive, through the transceiver, a plurality of operation contexts for the wearable electronic device to perform an operation according to an operation context,
determine a priority between the plurality of operation contexts,
control a parameter related to a movement of the plurality of cameras to perform an operation context having a top priority, and
change a combined field-of-view (FoV) and overlapping area formed by the plurality of cameras based on the movement of the plurality of cameras, and
wherein the plurality of cameras are configured to move, independently.

2. The wearable electronic device of claim 1, wherein the at least one processor is further configured to:
allow each of the plurality of cameras to independently perform movement, rotation, and zooming.

3. The wearable electronic device of claim 1, wherein the at least one processor is further configured to:
initialize the parameter before operating the operation context having the top priority.

4. The wearable electronic device of claim 1, wherein the at least one processor is further configured to:
perform calibration on a configuration of the parameter to perform the operation context having the top priority.

5. The wearable electronic device of claim 1, wherein the at least one processor is further configured to:
when the plurality of operation contexts are not received within a predetermined time, regard the wearable electronic device as being in an idle state and allow one of the plurality of cameras to scan an entire FoV.

6. The wearable electronic device of claim 1, wherein the at least one processor is further configured to:
in a situation where a structure of a scene is to be recognized, move the plurality of cameras to extend the combined FoV.

7. The wearable electronic device of claim 1, wherein the at least one processor is further configured to:
control each of the plurality of cameras including a left camera and a right camera to perform at least one of rotating the left camera to a left, moving the left camera to the left, rotating the right camera to a right, and moving the right camera to the right to extend the combined FoV.

8. The wearable electronic device of claim 1, wherein the at least one processor is further configured to:
in a situation where a specific object is to be tracked, move the plurality of cameras to extend the overlapping area so that the specific object is included in the overlapping area.

9. The wearable electronic device of claim 1, wherein the at least one processor is further configured to:
control each of the plurality of cameras including a left camera and a right camera to perform at least one of rotating the left camera to a right, moving the left camera to the right, rotating the right camera to a left, and moving the right camera to the left to extend the overlapping area.

10. The wearable electronic device of claim 1, wherein the at least one processor is further configured to:
in a situation where a specific object is not scanned in the combined FoV, control the movement of the plurality of cameras so that the combined FoV moves to the specific object.

11. The wearable electronic device of claim 1, wherein the at least one processor is further configured to:
control each of the plurality of cameras including a left camera and a right camera to rotate or move the left camera and/or the right camera in a same direction so that the combined FoV moves to a specific object.

12. A method by a wearable electronic device, the method comprising:
receiving a plurality of operation contexts for the wearable electronic device to perform an operation according to an operation context;
determining a priority between the plurality of operation contexts;
calculating a parameter related to a movement of a plurality of cameras to perform an operation context having a top priority; and
changing a combined field-of-view (FoV) and overlapping area formed by the plurality of cameras based on the movement of the plurality of cameras,
wherein the plurality of cameras are configured to moved, independently.

13. The method of claim 12, wherein a movement, rotation, and zooming of each of the plurality of cameras are independently performed.

14. The method of claim 12, further comprising:
initializing the parameter before operating the operation context having the top priority.

15. The method of claim 12, further comprising:
performing calibration on a configuration of the parameter to perform the operation context having the top priority.

16. The method of claim 12, further comprising:
when the plurality of operation contexts are not received within a predetermined time, regarding the wearable electronic device as being in an idle state and allowing one of the plurality of cameras to scan an entire FoV.

17. The method of claim 12, further comprising:
in a situation where a structure of a scene is to be recognized, moving the plurality of cameras to extend the combined FoV; and
in the plurality of cameras including a left camera and a right camera, performing at least one of rotating the left camera to a left, moving the left camera to the left, rotating the right camera to a right, and moving the right camera to the right to extend the combined FoV.

18. The method of claim 12, further comprising:
in a situation where a specific object is to be tracked, moving the plurality of cameras to extend the overlapping area; and
in the plurality of cameras including a left camera and a right camera, performing at least one of rotating the left camera to a left, moving the left camera to the left, rotating the right camera to a right, and moving the right camera to the right to extend the overlapping area.

19. The method of claim 12, further comprising:
in a situation where a specific object is not scanned in the combined FoV, moving the plurality of cameras so that the combined FoV moves to the specific object; and
in the plurality of cameras including a left camera and a right camera, rotating or moving the left camera and/or the right camera in a same direction to move the combined FoV.

* * * * *